United States Patent
Xu et al.

(10) Patent No.: US 12,456,205 B2
(45) Date of Patent: Oct. 28, 2025

(54) METHOD AND APPARATUS WITH OBJECT TRACKING USING DYNAMIC FIELD OF VIEW

(71) Applicant: SAMSUNG ELECTRONICS CO., LTD., Suwon-si (KR)

(72) Inventors: Jingtao Xu, Beijing (CN); Yiwei Chen, Beijing (CN); Feng Qiu, Beijing (CN); Byung In Yoo, Seoul (KR); Changbeom Park, Seoul (KR); Hyunjeong Lee, Seoul (KR); Jaejoon Han, Seoul (KR); Qiang Wang, Beijing (CN); Jiaqian Yu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 239 days.

(21) Appl. No.: 17/541,753

(22) Filed: Dec. 3, 2021

(65) Prior Publication Data

US 2022/0180531 A1    Jun. 9, 2022

(30) Foreign Application Priority Data

Dec. 4, 2020   (CN) .......................... 202011412120.4
Oct. 14, 2021  (KR) ........................ 10-2021-0136809

(51) Int. Cl.
  *G06T 7/246*   (2017.01)
  *G06T 7/292*   (2017.01)
  (Continued)

(52) U.S. Cl.
  CPC .............. *G06T 7/246* (2017.01); *G06T 7/292* (2017.01); *G06V 10/22* (2022.01); *G06V 10/40* (2022.01);
  (Continued)

(58) Field of Classification Search
  CPC ................... G06T 7/246; G06T 7/292; G06T 2207/20081; G06T 2207/20084;
  (Continued)

(56) References Cited

U.S. PATENT DOCUMENTS 9,589,374 B1   3/2017  Gao et al.
10,559,086 B1  2/2020  Miller et al.
(Continued)

FOREIGN PATENT DOCUMENTS

CN   106408593 A   2/2017
CN   107066990 A   8/2017
(Continued)

OTHER PUBLICATIONS

Lain, Bruno, et al. "Robust object tracking in a dual camera sensor." 2011 4th International Conference on Human System Interactions, HSI 2011. IEEE, 2011, (8 pages in English) (Year: 2011).*

(Continued)

*Primary Examiner* — Nay A Maung
*Assistant Examiner* — Dustin Bilodeau
(74) *Attorney, Agent, or Firm* — NSIP Law

(57) ABSTRACT

A method with object tracking includes: determining a first target tracking state by tracking a target from a first image frame with a first field of view (FoV); determining a second FoV based on the first FoV and the first target tracking state; and generating a second target tracking result by tracking a target from a second image frame with the second FoV.

17 Claims, 20 Drawing Sheets

(51) Int. Cl.
  *G06V 10/22* (2022.01)
  *G06V 10/40* (2022.01)
(52) U.S. Cl.
  CPC ............. *G06T 2207/20081* (2013.01); *G06T 2207/20084* (2013.01)
(58) Field of Classification Search
  CPC ......... G06T 2207/30228; G06V 10/22; G06V 10/40; G06V 10/23; G06V 10/25; G06V 10/82
  See application file for complete search history.

(56) References Cited

U.S. PATENT DOCUMENTS

| | | | |
|---|---|---|---|
| 2012/0242809 A1 | 9/2012 | White et al. | |
| 2016/0252619 A1 | 9/2016 | Markendorf et al. | |
| 2016/0260196 A1 | 9/2016 | Roimela et al. | |
| 2016/0314585 A1 | 10/2016 | Thomas | |
| 2017/0109599 A1 | 4/2017 | Gupta et al. | |
| 2017/0280125 A1 | 9/2017 | Brown et al. | |
| 2018/0160047 A1* | 6/2018 | Price | H04N 13/207 |
| 2018/0330509 A1* | 11/2018 | Watanabe | G08G 1/16 |
| 2022/0004770 A1* | 1/2022 | Lei | G06V 10/809 |

FOREIGN PATENT DOCUMENTS

| | | | | |
|---|---|---|---|---|
| CN | 109493367 A | | 3/2019 | |
| CN | 111754541 A | * | 10/2020 | ............. G06T 3/40 |
| CN | 111915647 A | | 11/2020 | |
| KR | 10-2011-0138500 A | | 12/2011 | |
| WO | WO 2012/091878 A2 | | 7/2012 | |
| WO | WO 2020/038243 A1 | | 2/2020 | |

OTHER PUBLICATIONS

Huang, Kun, et al. "Automatic target locating system through cooperative dual-field imaging." Selected Papers from Conferences of the Photoelectronic Technology Committee of the Chinese Society of Astronautics, Part II. vol. 9522. SPIE, 2015, (6 pages in English) (Year: 2015).*
Collins, Robert T., et al. "A system for video surveillance and monitoring." *VSAM final report* 2000.1-68 (2000).
Kim, Joo-Hee, et al. "Object Tracking by Interoperation of Dual Camera." Proceedings of the Korea Information Processing Society Conference. Korea Information Processing Society, 2011, (4 pages in English and 3 pages in Korean).
Lain, Bruno, et al. "Robust object tracking in a dual camera sensor." 2011 4th International Conference on Human System Interactions, HSI 2011. IEEE, 2011, (8 pages in English).
Huang, Kun, et al. "Automatic target locating system through cooperative dual-field imaging." Selected Papers from Conferences of the Photoelectronic Technology Committee of the Chinese Society of Astronautics, Part II. vol. 9522. SPIE, 2015, (6 pages in English).
Extended European search report issued on Oct. 7, 2022, in counterpart European Patent Application No. 21212350.9 (11 pages in English).
Chinese Office Action issued on Sep. 6, 2025, in counterpart Chinese Patent Application No. 202011412120.4(9 pages in English, 8 pages in Chinese).
Zhu, Zheng, et al. "Distractor-aware siamese networks for visual object tracking." *Proceedings of the European conference on computer vision (ECCV)*. 2018(pp. 101-117).

* cited by examiner

METHOD AND APPARATUS WITH OBJECT TRACKING USING DYNAMIC FIELD OF VIEW

CROSS-REFERENCE TO RELATED APPLICATIONS

This application claims the benefit under 35 USC § 119(a) of Chinese Patent Application No. 202011412120.4 filed on Dec. 4, 2020 in the China National Intellectual Property Administration and Korean Patent Application No. 10-2021-0136809 filed on Oct. 14, 2021 in the Korean Intellectual Property Office, the entire disclosures of which are incorporated herein by reference for all purposes.

BACKGROUND

1. Field

The following description relates to an object tracking method and apparatus using a dynamic field of view (FoV).

2. Description of Related Art

Visual object tracking technology is a technology being studied in the computer vision field. To perform visual object tracking, a system may collect image sequences through image collection equipment such as cameras. A user may mark a target object in a first frame (or an initial frame) of an image sequence, and an object tracking algorithm may continue to track an object in a subsequent frame of the image sequence and may provide position information of the object. Object tracking technology may be used to extract template information corresponding to a target of a first frame, calculate a matching degree between the template information and different candidate positions within a search region of a subsequent video frame, and select a position with the highest matching degree to determine a position of the target.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method with object tracking includes: determining a first target tracking state by tracking a target from a first image frame with a first field of view (FoV); determining a second FoV based on the first FoV and the first target tracking state; and generating a second target tracking result by tracking a target from a second image frame with the second FoV.

The first image frame and the second image frame may be collected by different image collectors of a same electronic device.

The first FoV and the second FoV may be selected from predetermined reference FoVs.

The determining of the first target tracking state may include: generating a first target tracking result by tracking the target from the first image frame; and determining the first target tracking state based on the first target tracking result.

The first target tracking result may include a prediction confidence. The determining of the first target tracking state based on the first target tracking result may include determining the first target tracking state according to a result of a comparison of the prediction confidence and a preset threshold.

The preset threshold may include a first threshold and a second threshold. The determining of the first target tracking state according to the result of the comparison may include: in response to the prediction confidence being greater than the first threshold, determining the first target tracking state as a first state; in response to the prediction confidence being less than the second threshold, determining the first target tracking state as a second state; and, in response to the prediction confidence being greater than the second threshold and less than the first threshold, determining the first target tracking state as a third state.

The first FoV and the second FoV may be selected from a first reference FoV, a second reference FoV, and a third reference FoV, among the predetermined reference FOVs. The second reference FoV may be greater than the first reference FoV. The third reference FoV may be less than the first reference FoV. The determining of the second FoV may include: when the first FoV is the first reference FoV, determining the second FoV as the second reference FoV in response to the first target tracking state being the second state, determining the second FoV as the third reference FoV in response to the first target tracking state being the first state, and determining the second FoV as the first reference FoV in response to the first target tracking state being the third state; when the first FoV is the second reference FoV, determining the second FoV as the second reference FoV in response to the first target tracking state being the second state, determining the second FoV as the first reference FoV in response to the first target tracking state being the first state, and determining the second FoV as the second reference FoV in response to the first target tracking state being the third state; and when the first FoV is the third reference FoV, determining the second FoV as the first reference FoV in response to the first target tracking state being the second state, determining the second FoV as the third reference FoV in response to the first target tracking state being the first state, and determining the second FoV as the third reference FoV in response to the first target tracking state being the third state.

The generating of the second target tracking result may include: setting a reference template feature based on an initial image frame of an image sequence to which the second image frame belongs; determining a search region of the second image frame based on the second FoV and a position of the target of the first image frame, and obtaining a search feature from the search region; and generating the second target tracking result based on the reference template feature and the search feature.

The generating of the second target tracking result based on the reference template feature and the search feature may include: in response to the second FoV being the second reference FoV or the third reference FoV, generating a scaled template feature by scaling the reference template feature; and generating the second target tracking result based on the scaled template feature and the search feature.

The generating of the scaled template feature may include: in response to the second FoV being the second reference FoV, generating the scaled template feature by scaling down the reference template feature; and, in response to the second FoV being the third reference FoV, generating the scaled template feature by scaling up the reference template feature.

The generating of the second target tracking result based on the scaled template feature and the search feature may include: generating a feature map by performing a convolution operation on the scaled template feature and the search feature using the scaled template feature as a convolution kernel; and obtaining the second target tracking result based on the feature map.

The first target tracking result may include a prediction confidence, and either one or both of a target position and a target size. The determining of the first target tracking state based on the first target tracking result may include: obtaining at least one of a target relative displacement corresponding to the first image frame and a ratio between a size of the target of the first image frame and a size of the first image frame, based on either one or both of the target position and the target size; and determining the first target tracking state based on a result of a comparison of the prediction confidence and a preset threshold, and either one or both of a result of a comparison of the target relative displacement and a reference displacement and a result of a comparison of the ratio and a reference ratio.

The determining of the first target tracking state based on the result of the comparison of the prediction confidence and the preset threshold, and either one or both of the result of the comparison of the target relative displacement and the reference displacement and the result of the comparison of the ratio and the reference ratio include: in response to the prediction confidence being greater than a first threshold and the target relative displacement being less than the reference displacement, determining the first target tracking state as a first state; in response to the prediction confidence being greater than a second threshold and the ratio being less than the reference ratio, determining the first target tracking state as a second state; and in response to the prediction confidence being greater than the second threshold and less than the first threshold, determining the first target tracking state as a third state.

In another general aspect, a non-transitory computer-readable storage medium stores instructions that, when executed by a processor, cause the processor to perform the method described above.

In another general aspect, an apparatus with object tracking includes: a processor; and a memory including instructions executable on the processor. The processor is configured to, in response to the instructions being executed: determine a first target tracking state by tracking a target from a first image frame with a first field of view (FoV); determine a second FoV based on the first FoV and the first target tracking state; and generate a second target tracking result by tracking a target from a second image frame with the second FoV.

The processor may be further configured to: generate a first target tracking result by tracking the target from the first image frame; and determine the first target tracking state based on the first target tracking result.

The first target tracking result may include a prediction confidence. The processor may be further configured to determine the first target tracking state according to a result of a comparison of the prediction confidence and a preset threshold.

The first target tracking result may include a prediction confidence, and at least one of a target position and a target size. The processor may be further configured to: obtain at least one of a target relative displacement corresponding to the first image frame and a ratio between a size of the target of the first image frame and a size of the first image frame, based on at least one of the target position and the target size; an determine the first target tracking state based on a result of a comparison of the prediction confidence and a preset threshold, and either one or both of a result of a comparison of the target relative displacement and a reference displacement and a result of a comparison of the ratio and a reference ratio.

In another general aspect, and electronic device includes: a camera configured to operate with a plurality of reference fields of view (FoVs); and a processor. The processor is configured to: generate a first target tracking state by tracking a target from a first image frame with a first FoV; determine a second FoV based on the first FoV and the first target tracking state; an generate a second target tracking result by tracking a target from a second image frame with the second FoV. The first FoV corresponds to a first reference FoV among the plurality of reference FoVs, and the second FoV corresponds to a second reference FoV among the plurality of reference FoVs.

The processor may be further configured to: generate a first target tracking result by tracking the target from the first image frame; and determine the first target tracking state based on the first target tracking result.

Other features and aspects will be apparent from the following detailed description, the drawings, and the claims.

Figure 1:
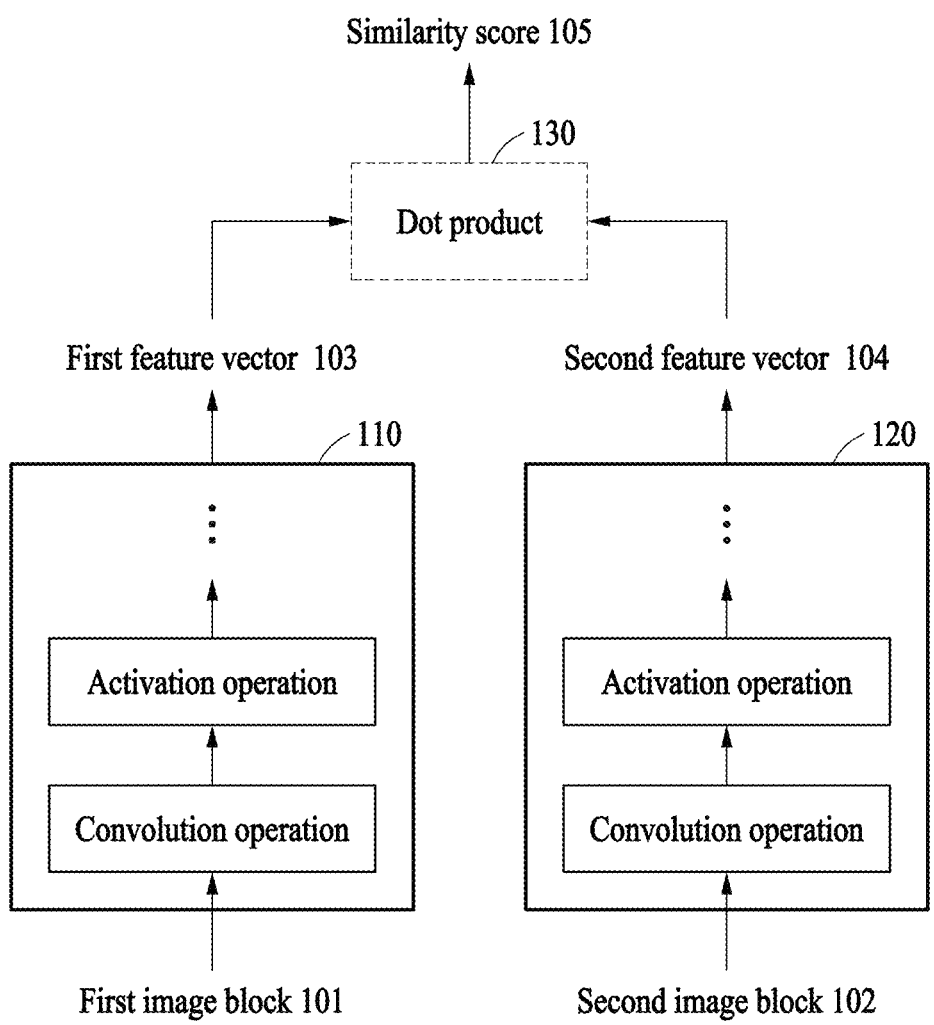
FIG. 1 illustrates an example of a basic structure of a twin network.

Throughout the drawings and the detailed description, the same drawing reference numerals refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Herein, it is to be noted that use of the term "may" with respect to an embodiment or example, e.g., as to what an embodiment or example may include or implement, means that at least one embodiment or example exists in which such a feature is included or implemented while all examples and examples are not limited thereto.

Unless otherwise defined, all terms used herein including technical or scientific terms have the same meaning as commonly understood by in the art in view of the context of this disclosure. It will be further understood that terms, such as those defined in commonly-used dictionaries, should be interpreted as having a meaning that is consistent with their meaning in the context of the relevant art and the context of this disclosure, and will not be interpreted in an idealized or overly formal sense unless expressly so defined herein.

The features of the examples described herein may be combined in various ways as will be apparent after an understanding of the disclosure of this application. Further, although the examples described herein have a variety of configurations, other configurations are possible as will be apparent after an understanding of the disclosure of this application.

In target tracking technology, a user may mark a target included in an initial video frame in a form of a bounding box. For example, the bounding box may be set with a high weight of an object and a low weight of a background. Subsequently, an algorithm may provide the bounding box and position information of a corresponding object in a subsequent video frame. Target tracking and marking may be provided in a form of a segmentation mask. The segmentation mask may finely mark the target in units of pixels by separating the target from a background. Thus, the algorithm may provide the segmentation mask and position information of a target object in a subsequent video frame. Mask tracking may have a large number of similarities to video object segmentation in comparison to bounding box tracking. In addition to bounding box tracking technology, the mask tracking may provide an additional segmentation branch, may output a central position of an object by integrating object segmentation technologies, and may output a segmentation mask map of the object. Although examples will be described below with reference to bounding box tracking technology, the examples may also apply to mask tracking technology.

In addition, target modeling may be converted by similarity training through a twin network-based target tracking algorithm. For example, when a similarity is calculated by comparing a template of an initial frame with a candidate region of a current frame, a target tracking result may be obtained based on a matching value. FIG. 1 illustrates an example of a process of deriving a similarity based on a twin network. Referring to FIG. 1, a first feature vector 103 of a first image block 101 and a second feature vector 104 of a second image block 102 may be extracted through network operations (e.g., convolution, activation, normalization, and the like) through two networks 110 and 120. A similarity score 105 of the first image block 101 and the second image block 102 may be derived by computing a dot product 130 of the first and second feature vectors 103 and 104.

Figure 2:
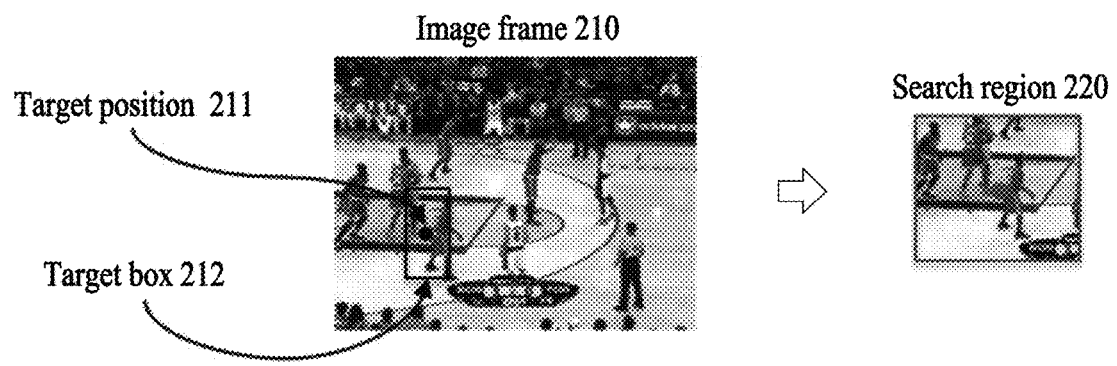
FIG. 2 illustrates an example of a process of generating a search region.

To obtain a similarity by calculating a convolution operation of a template feature kernel zf and a search region feature xf (hereinafter, referred to as a "search feature") using a twin network-based target tracking algorithm, a scale of a target of a template and a scale of a target of a search region may need to match each other. Referring to FIG. 2, a target tracking algorithm may obtain a search region 220 by cropping a region corresponding to a fixed multiple (e.g., ×4) of a size (e.g., a square root of a product of a width and a height corresponding to a target) of a target box 212 of a previous image frame based on a target position 211 predicted for the previous image frame from a current image frame 210. In the following description, an image frame may simply be referred to as a frame. If a change in a target between two frames is within a normal physical movement range, a scale of a target of the search region obtained by the above scheme may match the scale of the target of the template.

A fixed size of the search region may be regarded as a fixed field of view (FoV). Here, due to the fixed size of the search region, the following problems may occur:

(1) Cumulative error: Since a search region of each frame comes from information of a previous frame, if an error occurs, the error may be gradually accumulated into a next frame, which may eventually lead to a decrease in a target tracking accuracy.

Figure 3A:
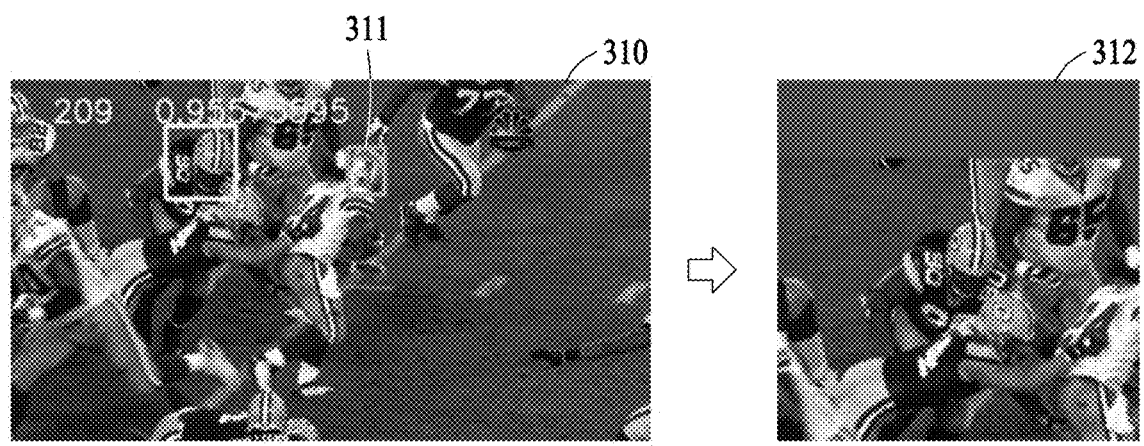
FIG. 3A illustrates an example of a target out of a field of view (FoV).

(2) Reduction in Robustness: If a real target object gradually moves out of an FoV due to an error, fixing a search range may allow a probability of finding the real target object again to zero. As shown in FIG. 3A, a target 311 deviates from a search region 312 of a current frame 310 due to an accumulated error of target information of a previous frame, and accordingly an accuracy of prediction through the current frame 310 may be reduced.

Figure 3B:
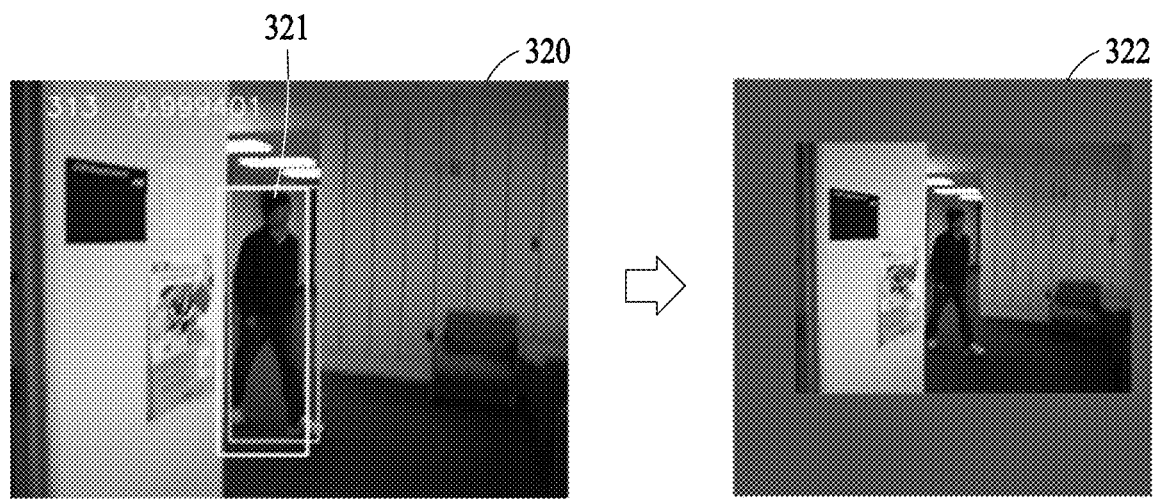
FIG. 3B illustrates an example of unnecessary magnification of an FoV.

(3) Waste of computing power: If a fixed multiple is used, a search region may deviate from an image frame, and a portion corresponding to the deviating search region may be filled with a predetermined value (e.g., an average value). If a current prediction is relatively accurate, that is, has a high confidence, large-scale padding may result in wasted computing power. Since a target 321 of FIG. 3B has clear features in a scene, a relatively high prediction confidence may be maintained. If a fixed multiple is used as shown in a search region 322 of a current frame 320 of FIG. 3B, computing power may be wasted in padding a wide region.

In examples described herein, the above problems may be solved. However, the above problems merely correspond to an example, and aspects or effects of the examples are not limited by the problems.

Figure 4:
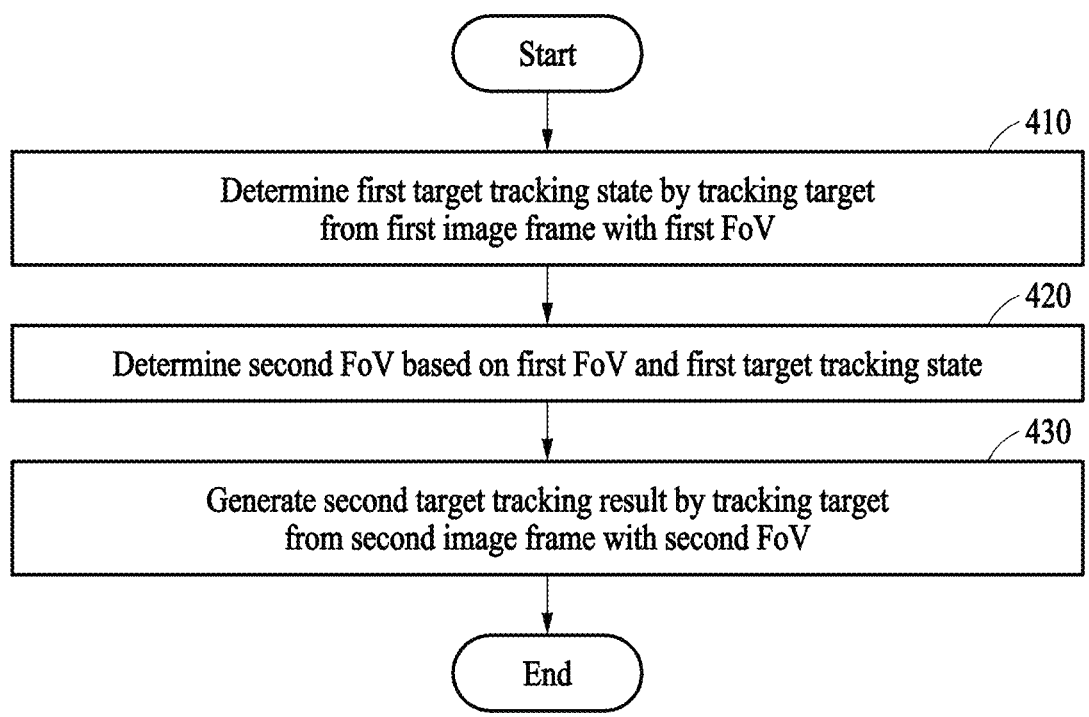
FIG. 4 is a flowchart illustrating an example of an object tracking method.

FIG. 4 is a flowchart illustrating an example of an object tracking method. As shown in FIG. 4, the object tracking method may include the following operations.

In operation 410, a first target tracking state may be determined by tracking a target from a first image frame with a first FoV. An n-th FoV may be an FoV used to track a target from an n-th image frame. An n-th target tracking state may be a target tracking state according to a target tracking result for the n-th image frame. The target tracking result for the n-th image frame may be referred to as an "n-th target tracking result."

In operation 420, a second FoV may be determined based on the first FoV and the first target tracking state. A target may be tracked from a second image frame with the second FoV. The first image frame and the second image frame may belong to the same image sequence. Image frames of the same sequence may be sequentially arranged, and the first image frame may be a previous image frame of the second image frame. An example in which the second image frame corresponds to a current image frame and the first image frame corresponds to a previous image frame will be described below.

In a target tracking process, tracking of a target from a previous image frame may be performed first, and accordingly a target tracking result may be obtained. For example, when an FoV used to track a target from the previous image frame is obtained, the target may be tracked from the previous image frame using the FoV, and accordingly a target tracking state may be determined according to a result of tracking the target. Based on the FoV used to track the target from the previous image frame and the target tracking state, an FoV used to track a target from the current image frame may be determined.

In operation 430, a second target tracking result may be generated by tracking a target from the second image frame with the second FoV.

For example, the second target tracking result may be obtained by tracking the target from the current image frame using the second FoV determined in operation 420. Before the target is tracked from the current image frame, an FoV used for target tracking of the current image frame may be determined based on an FoV corresponding to the previous image frame and the target tracking state.

The FoV for the current image frame may be dynamically adjusted. A size of a search region of the current image frame may be determined based on a size of a search region of the previous image frame and the target tracking state. For example, when the target tracking state of the previous image frame is relatively stable, an amount of computation may be reduced by properly narrowing the FoV corresponding to the current image frame. When the target tracking state of the previous image frame corresponds to a target loss, a possibility of finding a target again and robustness of target tracking may be enhanced by widening the FoV corresponding to the current image frame. In addition, since the FoV for the current image frame is dynamically adjusted, the number of cumulative errors may be reduced and an accuracy of target tracking may be enhanced.

According to examples, in a target tracking process for the current image frame, the FoV used to track a target from the current image frame may be dynamically adjusted based on the target tracking state and the FoV for target tracking of the previous image frame, and thus it may be possible to prevent an accumulation of errors, a reduction in robustness and waste of computing power due to use of a fixed FoV.

For example, an FoV for each image frame may be selected from predetermined reference FoVs. For example, the reference FoVs may include at least two of a first reference FoV, a second reference FoV, and a third reference FoV. The first FoV and/or the second FoV may be one of at least two of the first reference FoV, the second reference FoV, and the third reference FoV. The second reference FoV may be obtained by magnifying the first reference FoV by a first factor, and the third reference FoV may be obtained by reducing the first reference FoV by a second factor.

In an example, the first reference FoV may correspond to a normal FoV, the second reference FoV may correspond to a wide FoV obtained by magnifying the first reference FoV, and the third reference FoV may correspond to a narrow FoV obtained by reducing the first reference FoV. In this example, the first factor used for magnification and the second factor used for reduction may be set according to actual needs. A target tracking state for each image frame may be divided into the same number of states as a number of reference FoVs. For example, when three reference FoVs are provided, the target tracking state may also be divided into three states.

Figure 5:
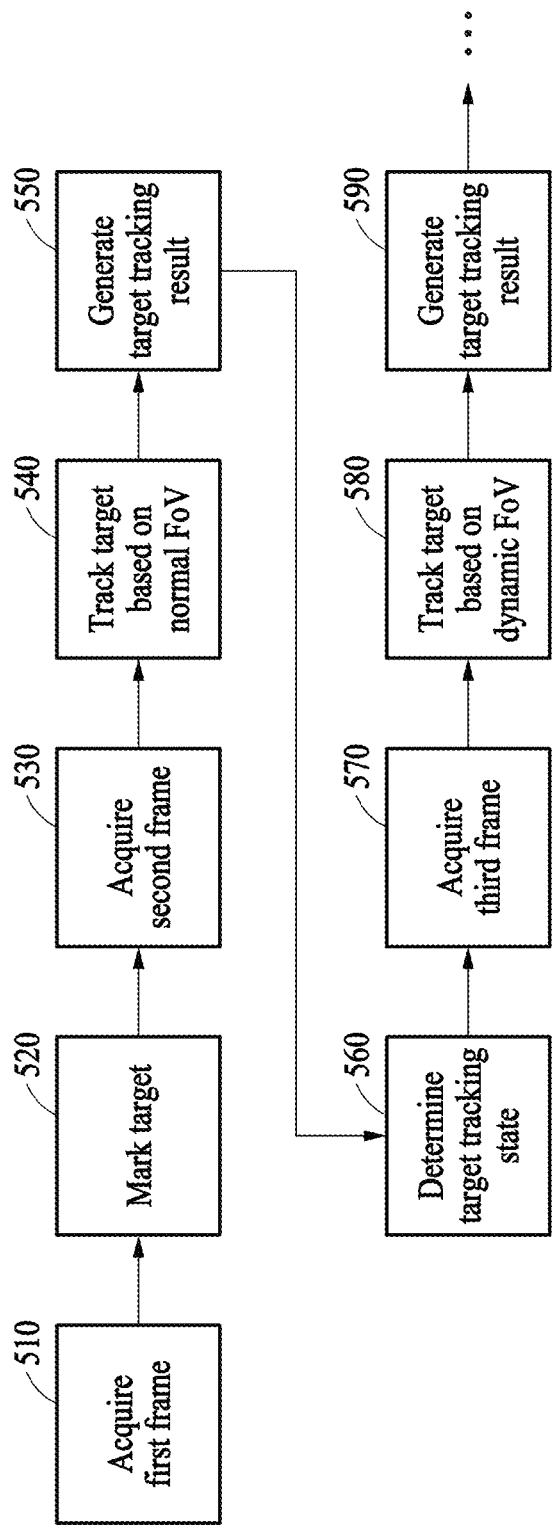
FIG. 5 is a flowchart illustrating an example of tracking an object of a video.

As shown in FIG. 5, a process of tracking a target from a video sequence using the object tracking method may include the following operations:

(1) operation 510 of acquiring a first frame (e.g., an initial frame or an initial image frame) of a video sequence;
(2) operation 520 of receiving a user input to mark a target;
(3) operation 530 of acquiring a second frame (e.g., a frame subsequent to the first frame) of the video sequence and starting a prediction (i.e., tracking) of a target position in the second frame;
(4) operation 540 of predicting the target position in the second frame of the video sequence using a normal FoV;
(5) operation 550 of generating a target tracking result of the second frame, wherein the target tracking result includes the target position and a prediction confidence;
(6) operation 560 of determining a target tracking state of the second frame based on the target tracking result of the second frame;
(7) operation 570 of acquiring a third frame (e.g., a frame subsequent to the second frame);
(8) operation 580 of determining a dynamic FoV for the third frame based on the target tracking state of the second frame, and tracking a target from the third frame using the determined dynamic FoV; and
(9) operation 590 of generating a target tracking result of the third frame.

Subsequently, the above operations may be repeatedly performed on subsequent frames.

For example, in the object tracking method, an FoV corresponding to a current image frame may be determined based on a target tracking state and an FoV corresponding to a previous image frame. In this example, the FoV corresponding to the previous image frame may be determined in advance during a target tracking process for the previous image frame. In determining of the FoV corresponding to the current image frame, it may be important to obtain the target tracking state corresponding to the previous image frame. A process of obtaining the target tracking state corresponding to the previous image frame will be described in detail below.

According to an example, determining of a target tracking state corresponding to a previous image frame of a current image frame may include obtaining a target tracking result corresponding to the previous image frame, determining the target tracking state corresponding to the previous image frame based on the target tracking result corresponding to the previous image frame.

The target tracking state corresponding to the previous image frame may be determined based on the target tracking result obtained in response to completion of tracking of a target of the previous image frame. For example, the target tracking result may include at least one of a target position (e.g., central coordinates of a target), a target size (e.g., a width and a height of a target), and a prediction confidence. A bounding box corresponding to a target may be determined based on the target position and the target size. The prediction confidence may indicate a confidence of the target position and the target size.

According to an example, the target tracking result may include a corresponding prediction confidence. The determining of the target tracking state corresponding to the previous image frame based on the target tracking result corresponding to the previous image frame may include determining the target tracking state according to a result of a comparison of the prediction confidence and a preset threshold. The preset threshold value may include a first threshold and a second threshold. If the prediction confidence is greater than the first threshold, the target tracking state may be determined as a predicted steady state. If the prediction confidence is less than the second threshold, the target tracking state may be determined as a target loss state. If the prediction confidence is greater than the second threshold and less than the first threshold, the target tracking state may be determined as a state between the predicted steady state and the target loss state. The predicted steady state may be represented as a first state, the target loss state may be represented as a second state, and the state between the predicted steady state and the target loss may be represented as an intermediate state or a third state.

According to an example, the target tracking state corresponding to the previous image frame may be evaluated based on the prediction confidence. For example, the first threshold and the second threshold may be preset. In this example, the first threshold may be greater than the second threshold. The prediction confidence corresponding to the previous image frame may be compared to the above thresholds, and a target prediction state may be determined based on a result of the comparison.

If the prediction confidence is greater than the first threshold, the confidence of the target position and the target size in the target tracking result may be high. This may indicate that the target tracking result is extremely stable. Accordingly, the target tracking state may be determined as a predicted steady state (or a stable target tracking state). If the prediction confidence is less than the second threshold, the confidence of the target position and the target size in the target tracking result may be low. This may indicate that the target tracking result is unstable. Accordingly, the target tracking state may be determined as a target loss state. If the prediction confidence is greater than the second threshold and less than the first threshold, the confidence of the target position and the target size in the target tracking result may be acceptable. This may indicate that stability of the target tracking result is acceptable. In this example, the target tracking state may be determined as an intermediate state.

According to an example, a tracking result may include either one or both of a target position and a target size, and a prediction confidence. The determining of the target tracking state corresponding to the previous image frame based on the target tracking result corresponding to the previous image frame may include obtaining either one or both of a target relative displacement corresponding to the previous image frame and a ratio between a size of a target of the previous image frame and a size of the previous image frame, based on at least one of the target position and the target size; and determining the target tracking state based on a result of a comparison of the prediction confidence and a predetermined threshold, and either one or both of a result of a comparison of the target relative displacement and a predetermined reference displacement and a result of a comparison of the ratio and a predetermined reference ratio. If the prediction confidence is greater than the first threshold and the target relative displacement is less than the reference displacement, the target tracking state may be determined as a predicted steady state. If the prediction confidence is less than the second threshold and the ratio is less than the reference ratio, the target tracking status may be determined as a target loss state. If the prediction confidence is greater than the second threshold and less than the first threshold, the target tracking state may be determined as an intermediate state.

In this example, the target tracking state of the previous image frame may be evaluated by combining the target position and the target size based on the prediction confidence. For example, based on the first threshold and the second threshold, the reference displacement (to evaluate the target relative displacement) and the reference ratio (to evaluate the ratio between the size of the target and the total size) may be set. Subsequently, a result of a comparison of the prediction confidence corresponding to the previous image frame and thresholds, a result of a comparison of the target relative displacement corresponding to the previous image frame and the reference displacement, and a result of a comparison of the ratio between the target size and the size of the previous image frame and the reference ratio may be derived. The target prediction state may be determined based on the results of the comparisons.

The target relative displacement corresponding to the previous image frame may indicate a relative displacement corresponding to a change in a position of a target from an image frame preceding the previous image frame to the previous image frame. For example, the previous frame may be represented as a frame T−1, and a frame preceding the previous frame may be represented as a frame T−2. An absolute value of a difference between target positions respectively corresponding to the frames T−1 and T−2 may be calculated, and an average value of target sizes respectively corresponding to the frames T−1 and T−2 may be calculated. A ratio of the absolute value to the average value may be removed, and accordingly the target relative displacement may be obtained.

If the prediction confidence is greater than the first threshold and the target relative displacement is less than the reference displacement, the confidence of the target position and the target size in the target tracking result may be high. This may indicate that the target tracking result is extremely stable. Accordingly, the target tracking state may be determined as a predicted steady state (or a stable target tracking state).

If the prediction confidence is less than the second threshold and the ratio is less than the reference ratio, the confidence of the target position and the target size in the target tracking result may be low. This may indicate that the target tracking result is unstable. Accordingly, the target tracking state may be determined as a target loss state.

If the prediction confidence is greater than the second threshold and less than the first threshold, the confidence of the target position and the target size in the target tracking result may be acceptable. This may indicate that the stability of the target tracking result is acceptable. In this example, the target tracking state may be determined as an intermediate state. In a process of determining a predicted steady state and a target loss, a parallel determination condition may be added, and thus an accuracy of subsequent target tracking and the determined target tracking state may be enhanced.

When the target tracking state corresponding to the previous image frame is determined using the above scheme, an FoV corresponding to the current image frame may be determined by combining the target tracking state with an FoV corresponding to the previous image frame. Hereinafter, a corresponding process will be described in detail.

According to an example, an operation of determining an FoV used to track a target from the current image frame based on the FoV corresponding to the current image frame and a corresponding target tracking state may include the following operations:

(1) when the FoV corresponding to the previous image frame is a first reference FoV, determining the FoV corresponding to the current image frame as a second reference FoV in response to the target tracking state being a target loss state, determining the FoV corresponding to the current image frame as a third reference FoV in response to the target tracking state being a predicted steady state, and determining the FoV corresponding to the current image frame as the first reference FoV in response to the target tracking state being an intermediate state;

(2) when the FoV corresponding to the previous image frame is the second reference FoV, determining the FoV corresponding to the current image frame as the second reference FoV in response to the target tracking state being a target loss state, determining the FoV corresponding to the current image frame as the first reference FoV in response to the target tracking state being a predicted steady state, and determining the FoV corresponding to the current image frame as the second reference FoV in response to the target tracking state being an intermediate state; and (3) when the FoV corresponding to the previous image frame is the third reference FoV, determining the FoV corresponding to the current image frame as the first reference FoV in response to the target tracking state being a target loss state, determining the FoV corresponding to the current image frame as the third reference FoV in response to the target tracking state being a predicted steady state, and determining the FoV corresponding to the current image frame as the third reference FoV in response to the target tracking state being an intermediate state.

Figure 6A:
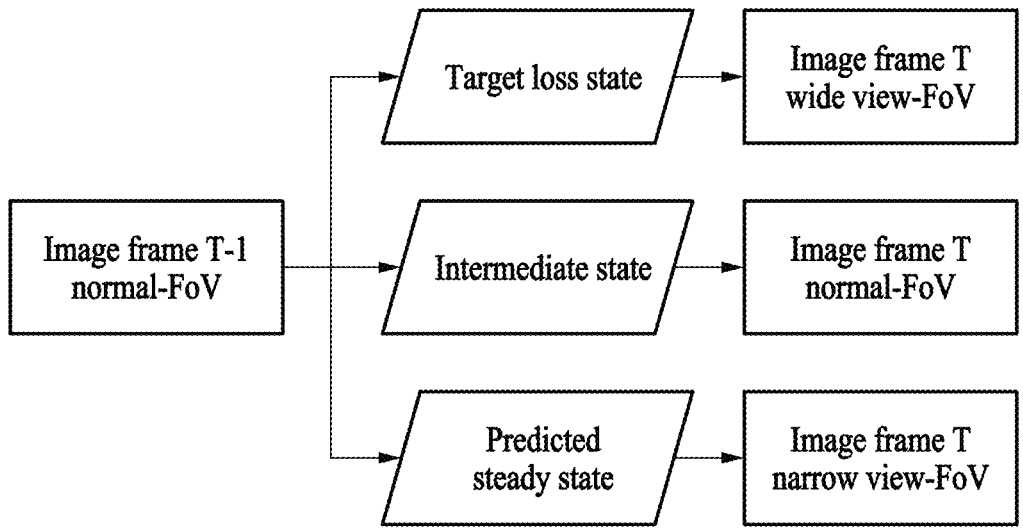
FIG. 6A illustrates an example of determining an FoV corresponding to a current image frame when a normal FoV is used for a previous image frame.
Figure 6B:
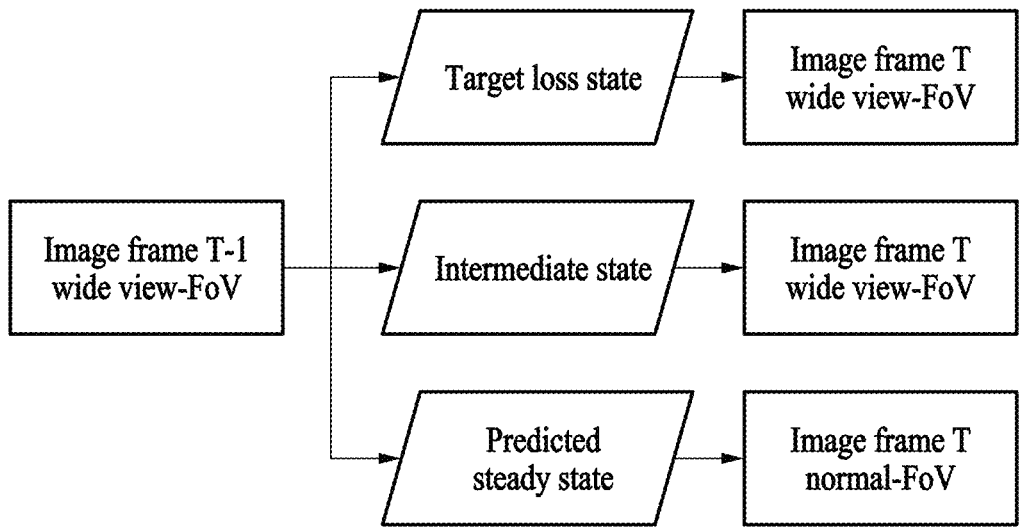
FIG. 6B illustrates an example of determining an FoV corresponding to a current image frame when a wide FoV is used for a previous image frame.
Figure 6C:
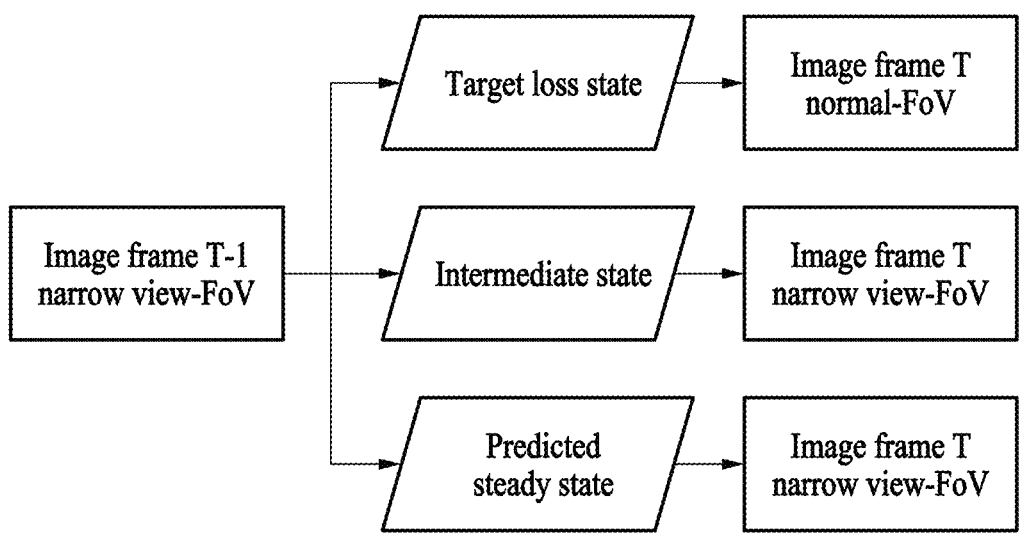
FIG. 6C illustrates an example of determining an FoV corresponding to a current image frame when a narrow FoV is used for a previous image frame.

For example, the current image frame may be an image frame T (corresponding to a time T), the previous image frame may be an image frame T−1 (corresponding to a time T−1), the first reference FoV may be a normal FoV, the second reference FoV may be a wide FoV, and the third reference FoV may be a narrow FoV. If an FoV corresponding to the image frame T−1 is a normal FoV, an FoV corresponding to the image frame T may be determined, as shown in FIG. 6A. The FoV corresponding to the image frame T may be determined as a wide FoV, a normal FoV, or a narrow FoV depending on whether a target tracking state is a target loss state, an intermediate state, or a predicted steady state. If the FoV corresponding to the image frame T−1 is a wide FoV, the FoV corresponding to the image frame T may be determined, as shown in FIG. 6B. If the FoV corresponding to frame T−1 is a narrow FoV, the FoV corresponding to the image frame T may be determined, as shown in FIG. 6C.

Figure 7A:
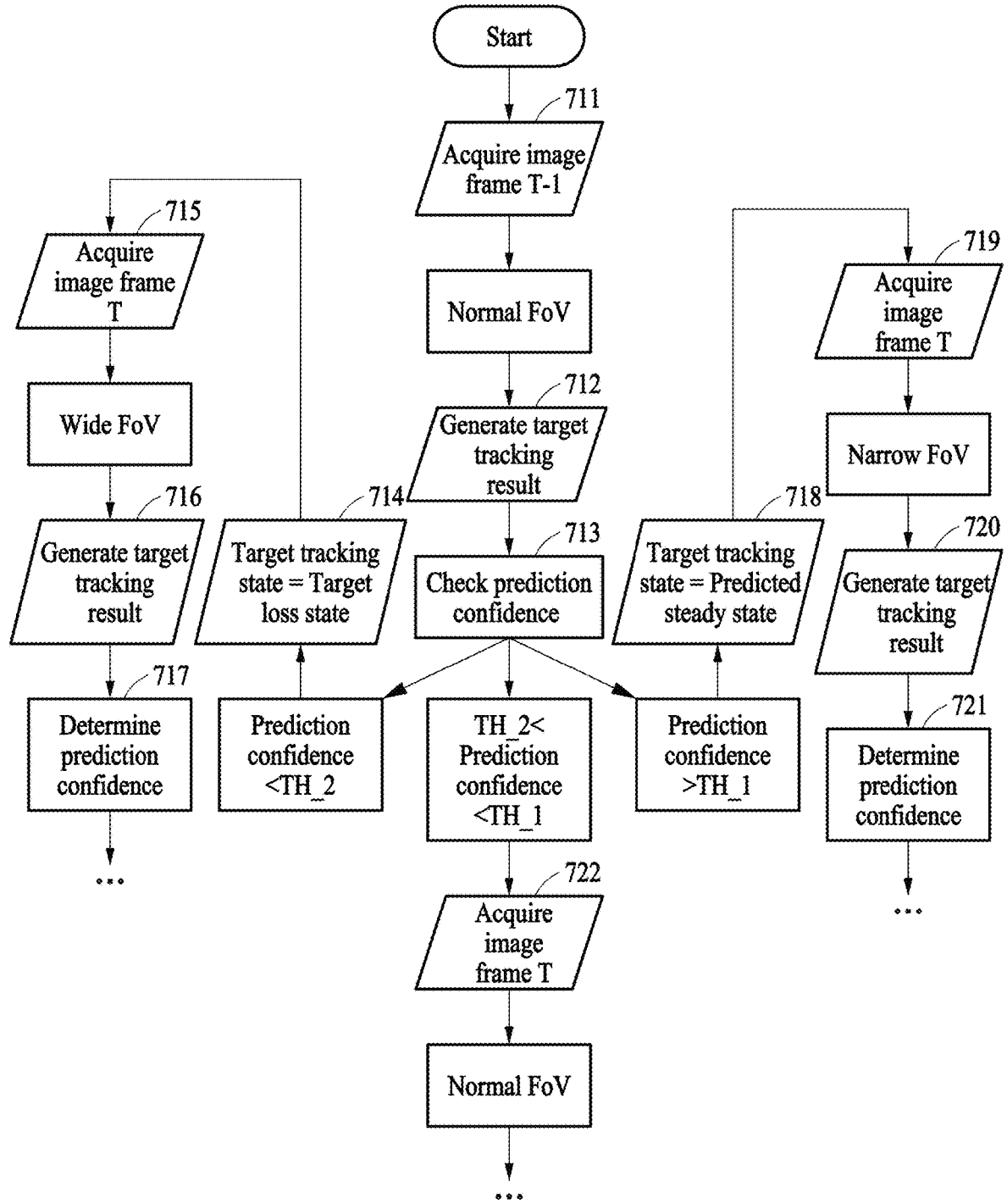
FIG. 7A is a flowchart of an example of determining an FoV corresponding to a current image frame based on a prediction confidence.

As shown in FIG. 7A, a frame T−1 may be acquired in operation 711. An FoV corresponding to the frame T−1 may be a normal FoV. In operation 712, a target tracking result (e.g., a target position, a target size, and a prediction confidence) according to the frame T−1 may be determined. In operation 713, a prediction confidence may be checked—for example, the prediction confidence and a threshold may be compared. A target tracking state may be determined according to a result of a comparison of the prediction confidence and the threshold. For example, when a prediction confidence corresponding to the frame T−1 is less than a threshold TH_2, the target tracking state may be determined as a target loss state in operation 714. In this example, an FoV corresponding to a next frame (e.g., a frame T) acquired in operation 715 may be determined as a wide FoV. For example, when the prediction confidence corresponding to the frame T−1 is greater than a threshold TH_1, the target tracking state may be determined as a predicted steady state in operation 718. In this example, an FoV corresponding to a next frame (e.g., a frame T) acquired in operation 719 may be determined as a narrow FoV. Subsequently, operations 716 and 720 corresponding to operation 712 and operations 717 and 721 corresponding to operation 713 may be repeatedly performed. Hyperparameters TH_1 and TH_2 may correspond to preset thresholds. For example, TH_1 may be "0.95", and TH_2 may be "0.55". For example, when the prediction confidence is greater than the threshold TH_2 and less than the threshold TH_1, the target tracking state may be determined as an intermediate state, and the original FoV (e.g., a normal FoV) may be maintained in association with a next frame (e.g., a frame T) acquired in operation 722.

Figure 7B:
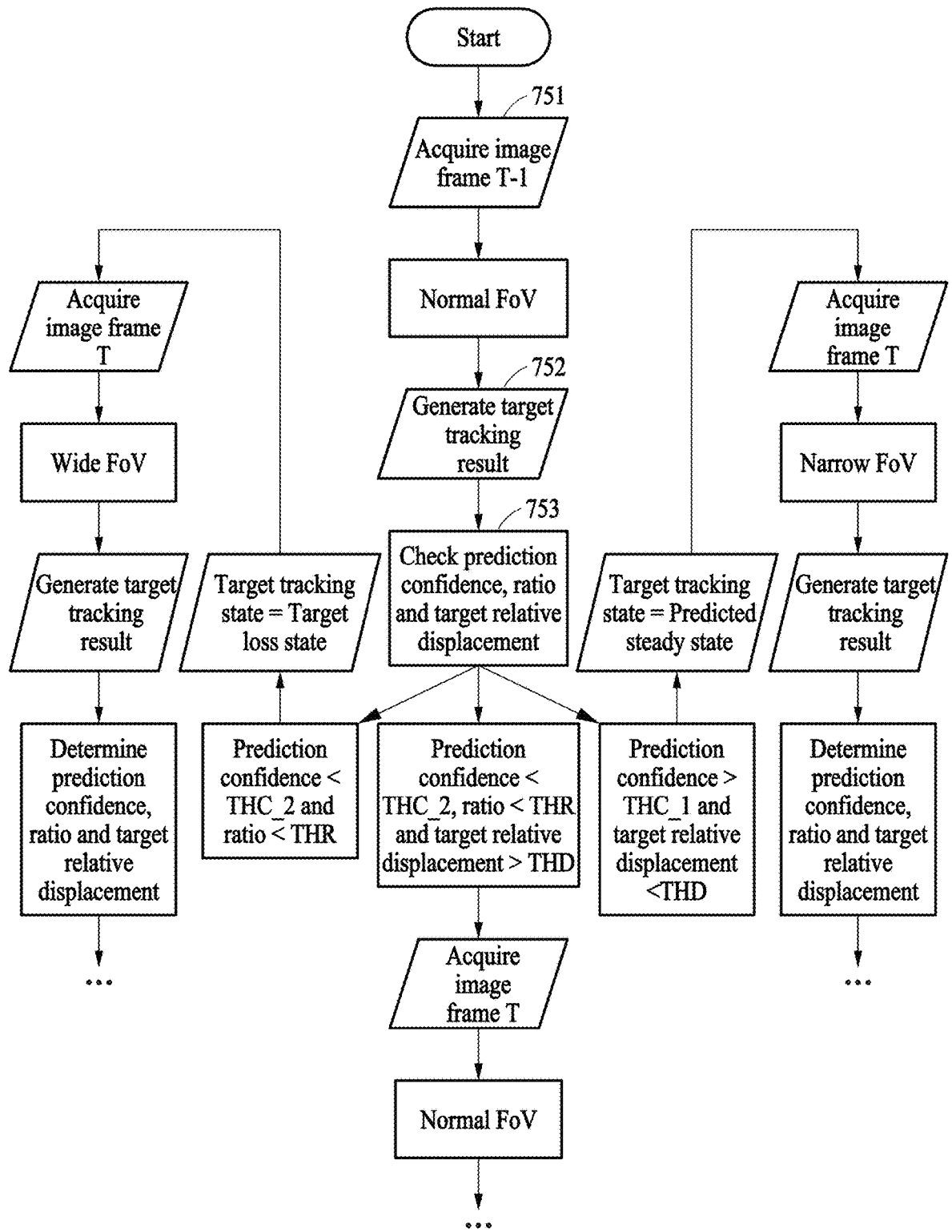
FIG. 7B is a flowchart of an example of determining an FoV corresponding to a current image frame based on a prediction confidence, a target position, and a target size.

As shown in FIG. 7B, a frame T−1 may be acquired in operation 751, and a target tracking result (e.g., a target position, a target size, and a prediction confidence) may be generated in operation 752. An FoV corresponding to the frame T−1 may be a normal FoV. In operation 753, a prediction confidence, a ratio between a size of a target and a size of the frame T−1, and a target relative displacement according to a target tracking result may be checked. For example, when the prediction confidence corresponding to the frame T−1 is less than a threshold THC_2 and when the ratio is less than a reference ratio THR, uncertainty of a target prediction may increase and the target may be regarded to be lost. Under an assumption that a target may be present within a region during magnification of an FoV, an FoV corresponding to a next frame (e.g., a frame T) may be determined as a wide FoV. For example, when the prediction confidence corresponding to the frame T−1 is greater than a threshold THC_1 and the target relative displacement is less than a reference displacement THD, a target prediction may be regarded to be stable. Under an assumption that a target may be present within a region after an FoV is reduced, the FoV corresponding to the next frame (i.e., a frame T) may be determined as a narrow FoV. Hyperparameters THC_1, THC_2, THR, and THD may correspond to preset thresholds, a reference ratio, and a reference displacement. For example, THC_1, THC_2, THR, and THD may be "0.55", "0.95", "0.2", and "0.5", respectively. For example, when the target tracking result is in an intermediate state, for example, when the prediction confidence is greater than TH_2 and less than TH_1, the target relative displacement is greater than THD, and the ratio is greater than THR, the original FoV (e.g., a normal FoV) may be maintained. In addition, the description provided with reference to FIG. 7A may apply to an example of FIG. 7B.

According to an example, an operation (e.g., operation 430 of FIG. 4) of generating a target tracking result corresponding to the current image frame based on an FoV corresponding to the current image frame may include setting a reference template feature based on an initial image frame of an image sequence to which the current image frame belongs, determining a search region of the current image frame (e.g., a second image frame) based on the FoV (e.g., a second FoV) corresponding to the current image frame and a target position (e.g., a target position according to a first target tracking result) of the previous image frame (e.g., a first image frame), obtaining a search feature from the search region, and generating the target tracking result (e.g., a second target tracking result) based on the reference template feature and the search feature.

Figure 8:
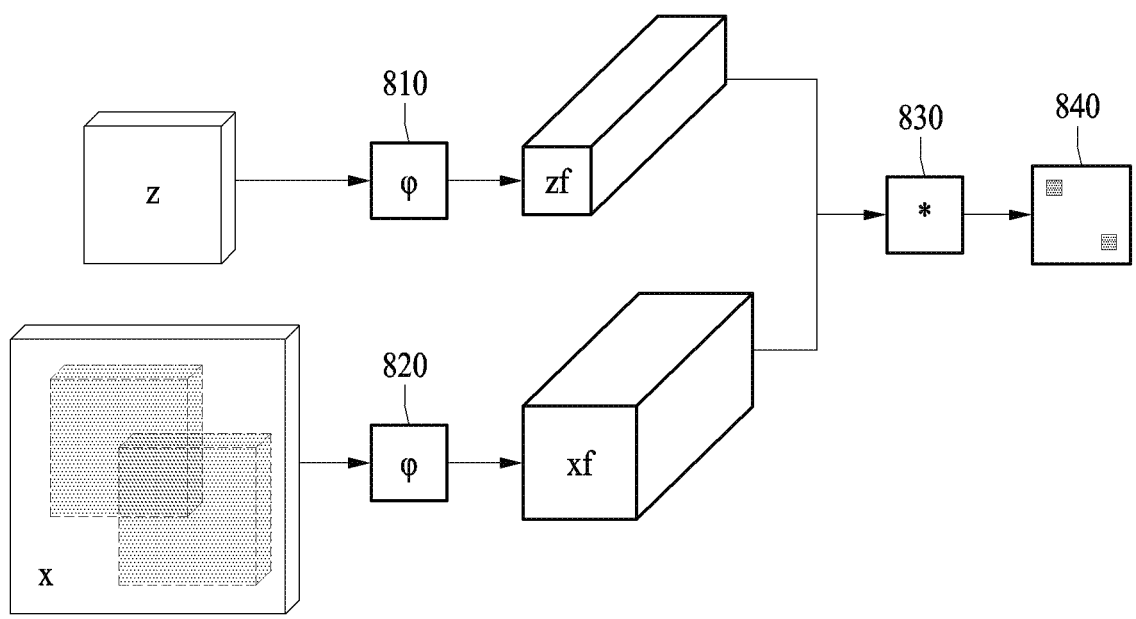
FIG. 8 illustrates an example of an object tracking method based on a twin network.

For example, a target may be tracked using a twin fully convolutional network based on a twin network. For example, as shown in FIG. 8, a process of obtaining a target tracking result based on a twin fully convolutional network may include the following operations:
(1) an operation of obtaining a template z from an initial image frame based on target information marked by a user (for example, the template z may have a size of 127×127×3);
(2) an operation of extracting a template feature zf by inputting the template z to a backbone network 810 (for example, the template feature zf may have a size of 6×6×128);
(3) an operation of determining a search region x corresponding to the previous image frame, in the current image frame, wherein the search region x has a target position corresponding to the previous image frame as a center and has an FoV determined according to examples as a size (for example, the search region x may have a size of 255×255 χ 3);
(4) an operation of obtaining a search feature xf corresponding to the search region x by inputting the search region x to a backbone network 820 (for example, the search feature xf may have a size of 22×22×128);
(5) an operation of obtaining a similarity map 840 (e.g., a similarity heat map, a similarity score map) associated with a size of each of the template feature zf and the search feature xf by performing a full convolution operation 830, that is, a point product summation operation, on the template feature zf and the search feature xf that are different in size (for example, the similarity map 840 may have a size of 17×17×1); and
(6) an operation of searching for a position with a greatest similarity value from the similarity map 840 and re-mapping the found position to a position of the original search region, that is, a target position of the current image frame.

Figure 9:
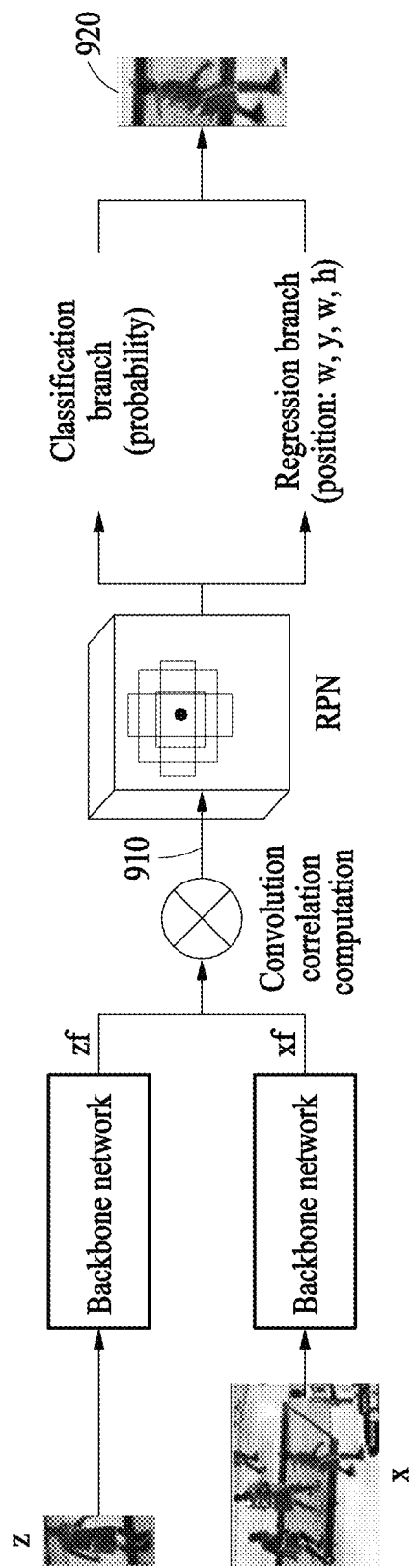
FIG. 9 illustrates an example of an object tracking method based on a twin region proposal network (RPN).

A twin region proposal network (RPN) may be derived by connecting an RPN to the twin fully convolutional network. When the RPN is combined with the twin fully convolutional network, "k" anchors may be generated each time a correlation corresponding to each position on the template feature zf and the search feature xf is computed. The "k" anchors may represent "k" candidate boxes, for example, a plurality of boxes in an RPN of FIG. 9. Candidate boxes may be centered at the anchors, but may have different sizes (e.g. different widths and/or different heights). As shown in FIG. 9, a convolution operation may be performed between a template feature zf of a first frame and a search feature xf of a current frame, to generate a similarity map 910. For example, the template feature zf may have a size of 4×4, the search feature xf may have a size of 20×20, and the similarity map 910 may have a size of 17×17. If "k" anchors are set to be generated at each position, "17×17×k" anchors in total may be generated in the similarity map 910. A twin RPN may include two branches, that is, a classification branch and a regression branch. The classification branch may generate probability values of a positive sample and a negative sample of a prediction target, and the regression branch may generate central coordinates (x, y) and magnitudes (w, h) of a prediction box. A target tracking result 920 for the current frame may be generated through the classification branch and the regression branch.

According to an example, an operation of generating the target tracking result (e.g., a second target tracking result)

corresponding to the current image frame based on the reference template feature and the search feature may include generating a scaled template feature by scaling the reference template feature when the FoV (e.g., a second FoV) corresponding to the current image frame is a second reference FoV or a third reference FoV, and generating the target tracking result corresponding to the current image frame based on the scaled template feature and the search feature.

In a target tracking process, a template feature may be extracted from an initial image frame (e.g., a first frame) of an image sequence, and an FoV corresponding to the initial image frame may be set as a normal FoV by default. If a dynamic FoV (e.g., a wide FoV or a narrow FoV) is used for a subsequent frame of the image sequence, a size of the template feature may be scaled to fuse feature scales extracted from different FoVs. For example, the following template feature kernel rescaling may be applied. For example, a wide FoV may be magnified by a factor of "r" compared to the normal FoV, the template feature may be scaled down to 1/r times the original size of the template feature (i.e., a size of the template feature in the normal FoV). If a narrow FoV is reduced by a factor of "1/r" compared to the normal FoV, the template feature may be scaled up to r times the original size of the template feature. Although the first factor and the second factor are assumed to be the same as "r" in the above scheme, the first factor and the second factor may be set to be different from each other.

A target tracking method based on a twin network or a twin RPN according to examples may not change settings of a backbone network. Accordingly, a size of an input image of the backbone network may be maintained. Thus, (1) there is no need to retrain the backbone network, (2) an amount of computation of a fixed backbone network may assist subsequent development of algorithm-based software systems, and (3) quick replacement of other backbone network structures may be possible instead of having an influence on settings of other modules.

According to an example, an operation of generating the scaled template feature by scaling the reference template feature may include generating the scaled template feature by scaling down the reference template feature when an FoV (e.g., a second FoV) corresponding to the current image frame is a second reference FoV, and generating the scaled template feature by scaling up the reference template feature when the FoV corresponding to the current image frame is a third reference FoV.

Figure 10A:
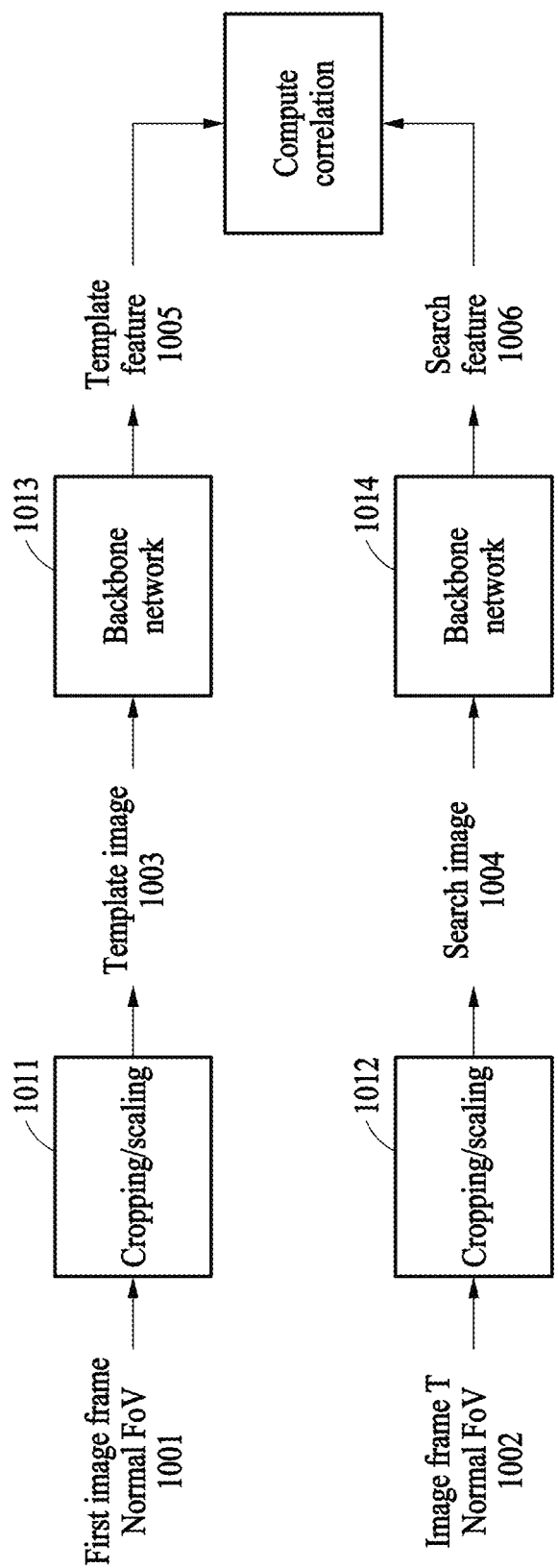
FIG. 10A is a flowchart of an example of computation of a correlation when a normal FoV is used for a current image frame.

For example, as shown in FIG. 10A, a template image 1003 may be obtained through cropping/scaling 1011 of a first image frame 1001. The template image 1003 may be obtained by cropping the first image frame 1001 to the same size as a size of a target and may be scaled to meet an input requirement (e.g., 127×127) of a backbone network 1013. The backbone network 1013 may generate a template feature 1005 according to a scaling result. If a normal FoV is used for the first image frame 1001 and an image frame T 1002 (i.e., a current image frame), a search image 1004 with a size that is "s" times a size of a target of a frame T−1 (i.e., a previous image frame) may be extracted from the image frame T 1002 based on a target position corresponding to the frame T−1. The search image 1004 may be scaled according to an input requirement (e.g., 255×255) of a backbone network 1014. The search image 1004 may be extracted and scaled through cropping/scaling 1012. When a scaling result passes through the backbone network 1014, a search region feature 1006 may be obtained, and a correlation between the search region feature 1006 and the template feature 1005 may be computed. For example, the template feature 1005 may have a size of w×h×C, and the search feature 1006 may have a size of W×H×C.

Figure 10B:
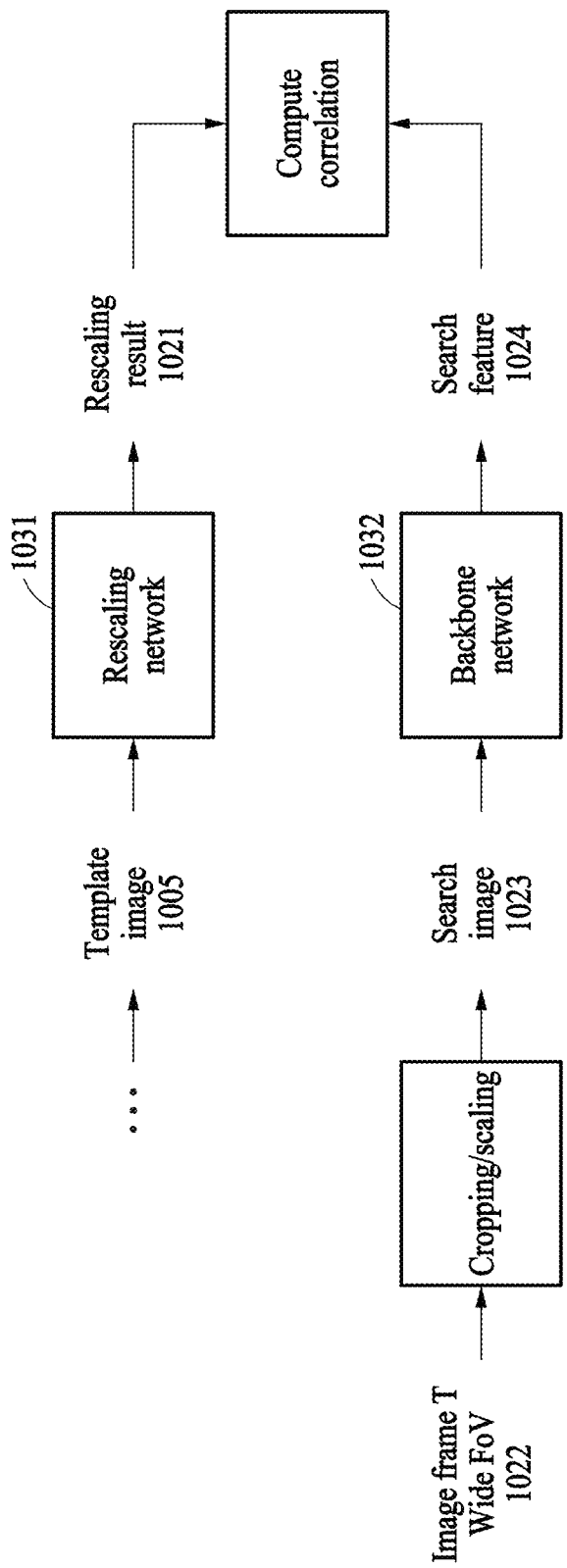
FIG. 10B is a flowchart of an example of computation of a correlation when a wide FoV is used for a current image frame.

As shown in FIG. 10B, when a wide FoV is used for an image frame T 1022, for example, when the wide FoV is r times (r>1, for example, r=2) the normal FoV, a search image 1023 with a size that is "s×r" times a size of a target of a frame T−1 may be extracted from the image frame T 1022 based on a target position corresponding to the frame T−1. The search image 1023 may be scaled according to an input requirement (e.g., 255×255) of a backbone network 1032. Through the scaling, the size of the target may be reduced by a factor of "1/r". To match a scale of a search feature and a scale of a template feature during computation of a correlation, a template feature 1005 may also be scaled by a corresponding ratio. Accordingly, the template feature 1005 may be reduced to 1/r times its original size. The template feature 1005 may correspond to the template feature 1005 of FIG. 10A. The template feature 1005 may be rescaled via a rescaling network 1031, and a correlation between a rescaling result 1021 and a search feature 1024 may be computed.

Figure 10C:
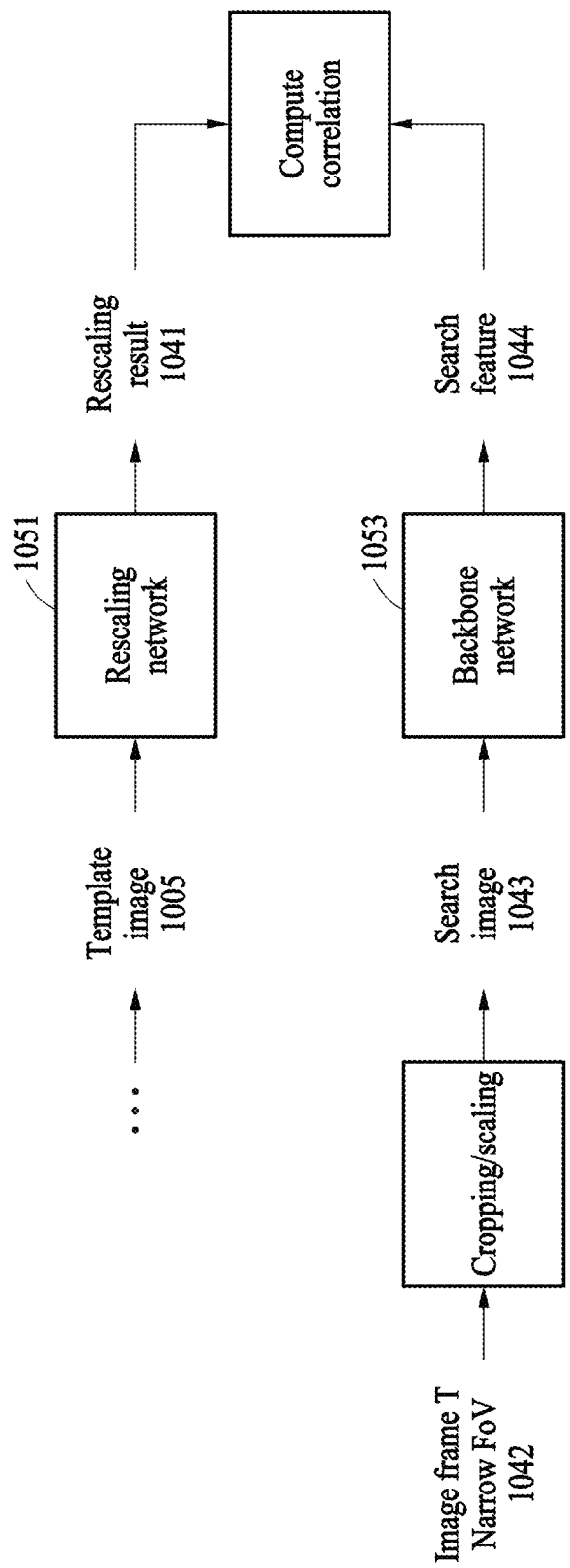
FIG. 10C is a flowchart of an example of computation of a correlation when a narrow FoV is used for a current image frame.

As shown in FIG. 10C, when a narrow FoV is used for an image frame T 1042, for example, when the narrow FoV is 1/r times (r>1, for example, r=2, 1/r=½) the normal FoV, a search image 1043 with a size that is "s×1/r" times a size of a target of a frame T−1 may be extracted from the image frame T 1042. The search image 1043 may be scaled according to an input requirement (e.g., 255×255) of a backbone network 1053. Accordingly, a size of a target may be magnified by a factor of "r". A template feature 1005 may also be magnified at a corresponding ratio, that is, r times the original size, via a rescaling network 1051, and a correlation between a rescaling result 1041 and a search feature 1044 may be computed. In addition, the description provided with reference to FIG. 10A may apply to examples of FIGS. 10B and 10C.

Figure 10D:
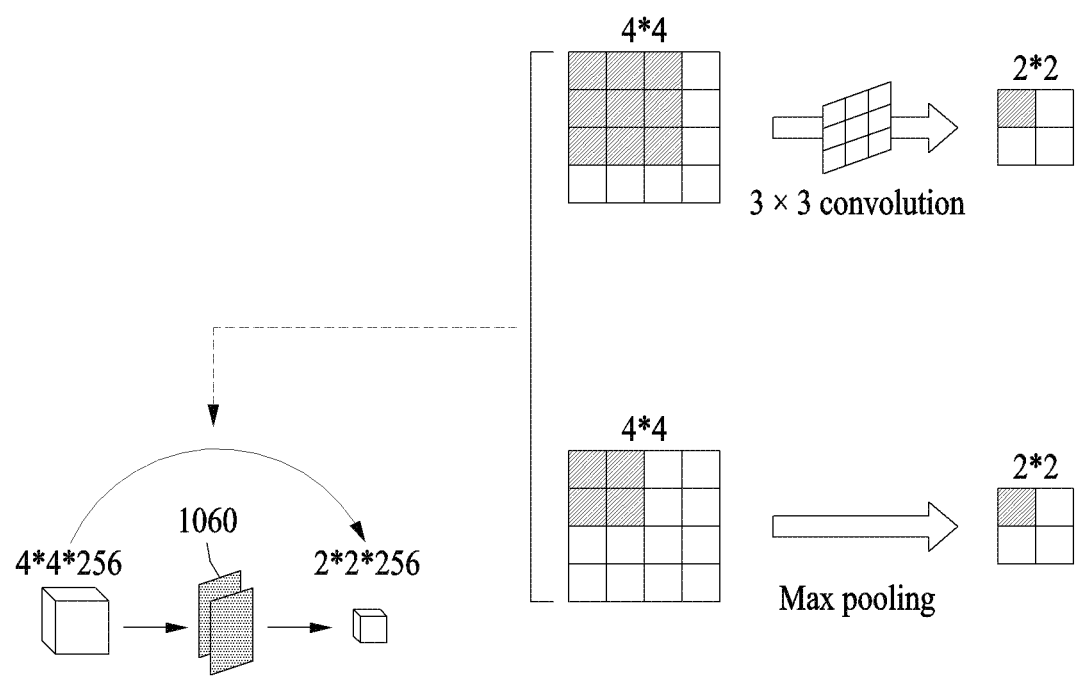
FIG. 10D illustrates an example of a template feature kernel reduction process.
Figure 10E:
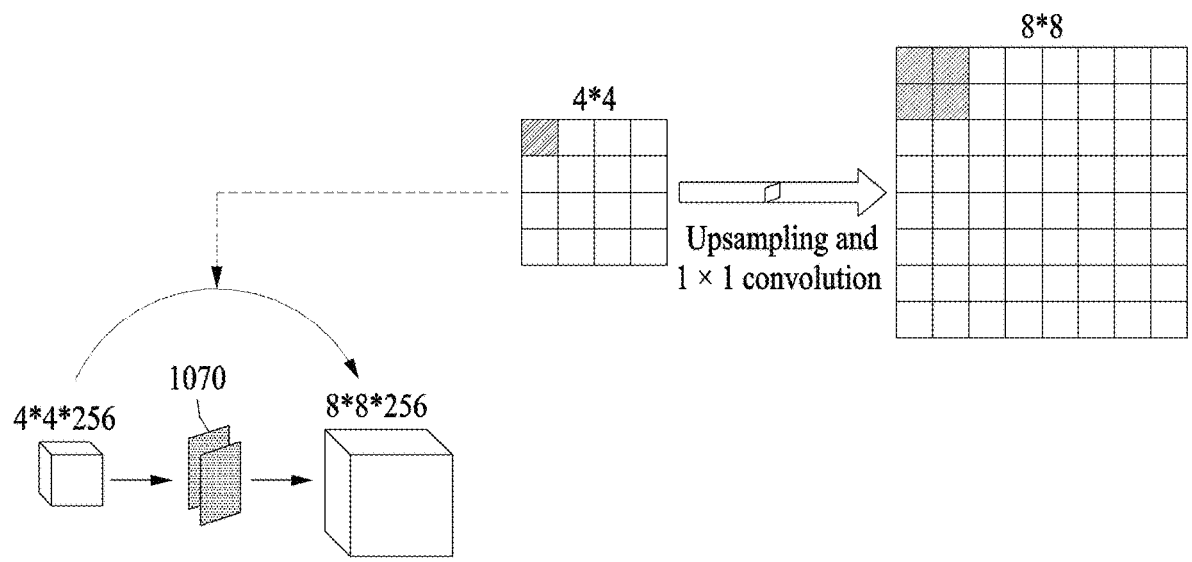
FIG. 10E illustrates an example of a template feature kernel amplification process.

A rescaling network (e.g., the rescaling networks 1031 and 1051, and rescaling networks 1060, 1070, 1142, and 1192) of a template feature kernel may be a neural network with a single layer, or a neural network with a small number of layers (e.g., two or three layers). A network according to examples may function to scale a template feature of w×h×C to (w/r)×(h/r)×C, or (rw)×(rh)×C. In this example, w/r, h/r, rw, and rh may all be integers. In an example, as shown in FIG. 10D, when w=h=4, r=2 and C=256 are satisfied, the rescaling network 1060 may obtain a scaling result by scaling a feature vector of 4×4×256 to 2×2×256 using a max-pooling layer, or using a convolution layer with a convolution kernel size of 3×3 and a padding size of "0". In another example, as shown in FIG. 10E, the rescaling network 1070 may obtain a scaling result by scaling a feature vector of 4×4×256 to 8×8×256 using an upsampling layer and a convolution layer with a convolution kernel size of 1×1.

According to an example, an operation of obtaining the target tracking result (e.g., a second target tracking result) corresponding to the current image frame based on the scaled template feature and the search feature may include generating a corresponding feature map by performing a convolution operation on the scaled template feature and the search feature using the scaled template feature as a convolution kernel, and generating the target tracking result (e.g., a second target tracking result) based on the feature map. The generating of the target tracking result based on the feature map may be realized through a region proposal algorithm.

Figure 11A:
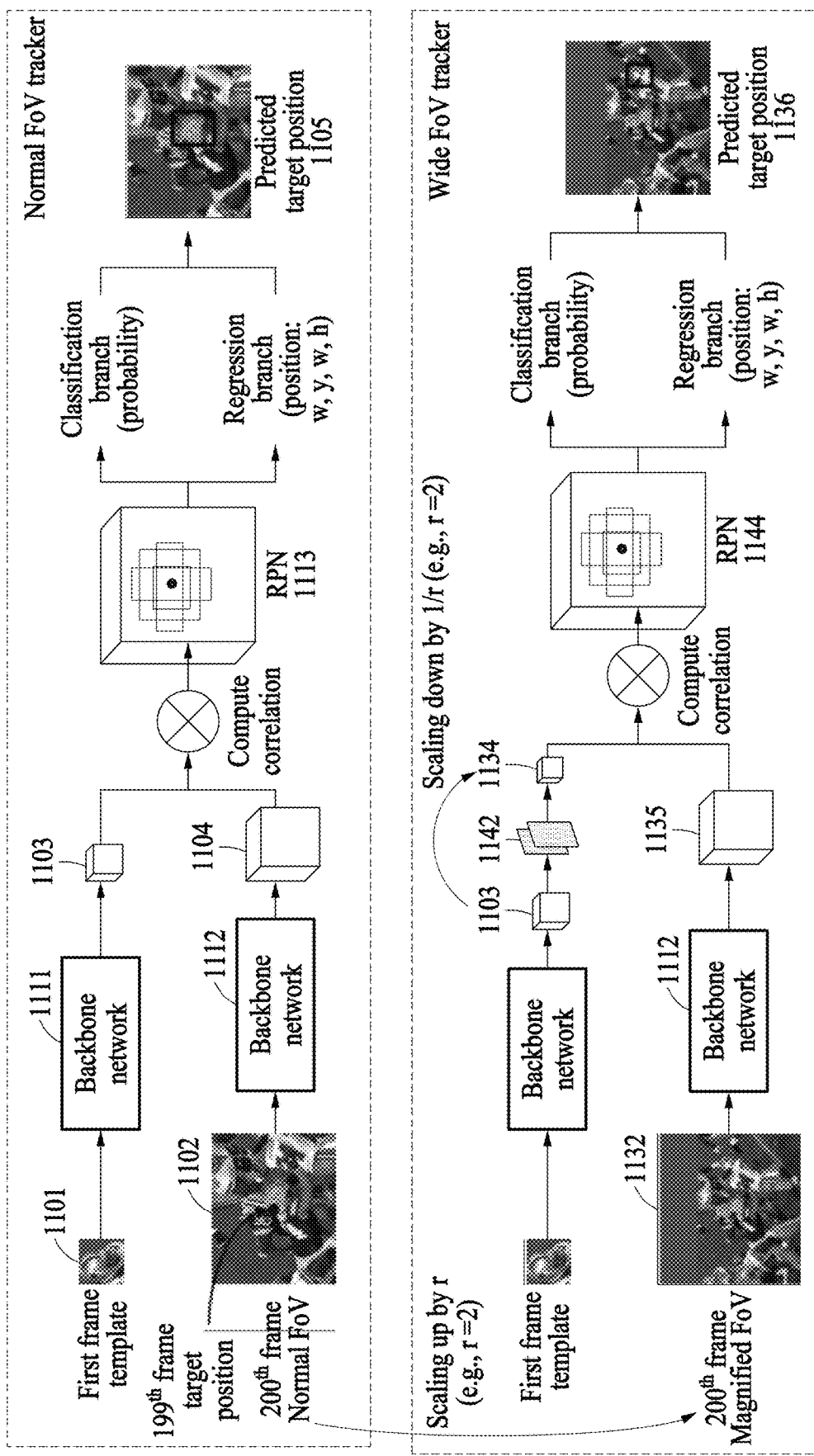
FIG. 11A illustrates an example of a comparison of a normal FoV and a wide FoV that are used in an object tracking method based on a twin network.
Figure 11B:
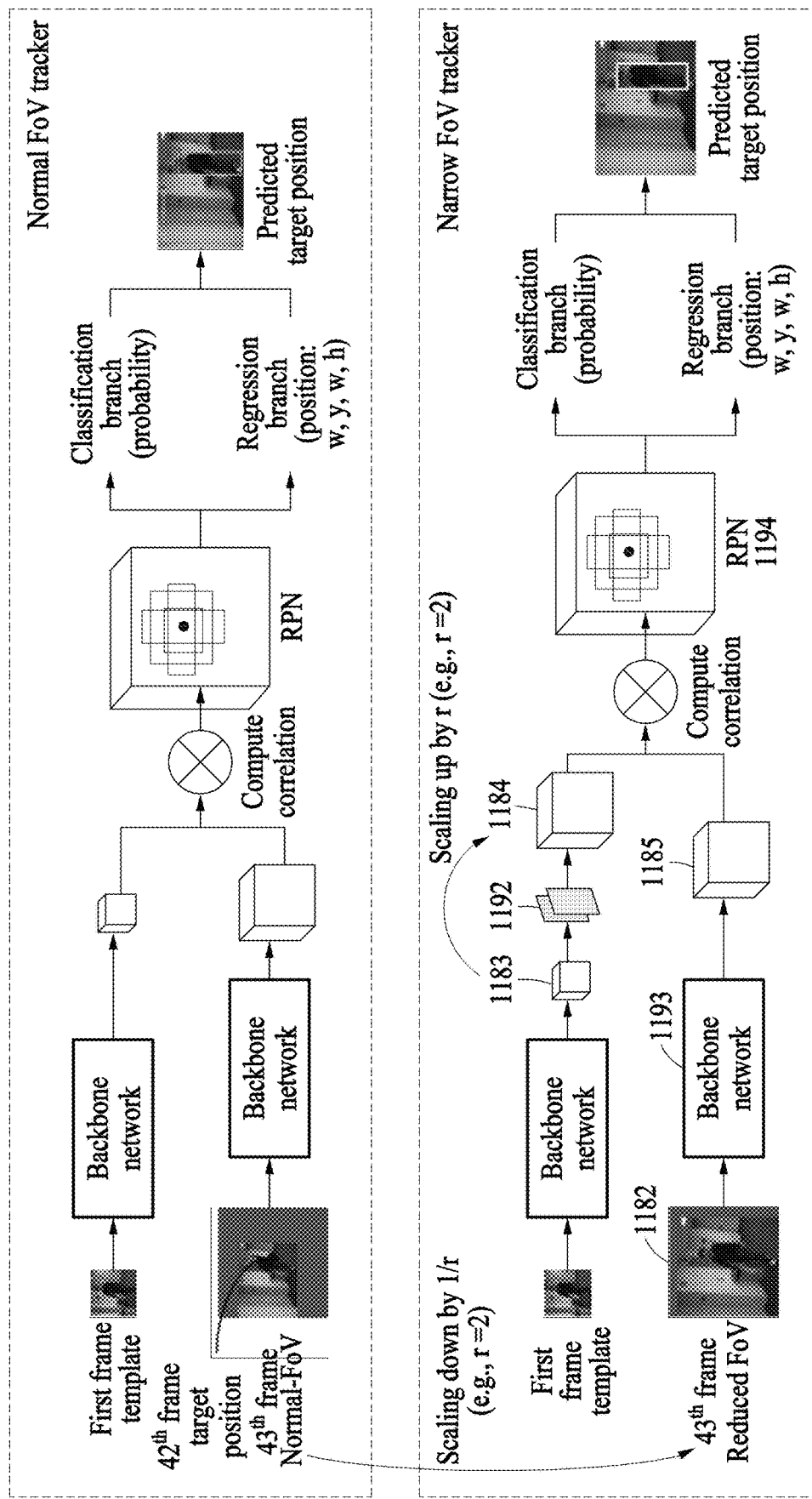
FIG. 11B illustrates an example of a comparison of a normal FoV and a narrow FoV that are used in an object tracking method based on a twin network.

For example, as shown in FIGS. 11A and 11B, dynamic FoV target tracking based on a twin network structure may be performed. A template 1101 of a first frame may be converted to an image block through cropping and/or scaling and may be input to a backbone network 1111, and the backbone network 1111 may output a template feature 1103. For example, the image block may have a size of 127×127, and the template feature 1103 may have a size of 4×4×256. A search image 1102 of a current frame (e.g., a $200^{th}$ frame) may be converted to an image block through cropping and/or scaling and may be input to a backbone network 1112, and the backbone network 1112 may output a search region feature 1104. For example, the image block may have a size of 255×255, and the search region feature 1104 may have a size of 20×20×256. If a normal FoV tracker is used, a correlation may be computed through a convolution operation between the template feature 1103 with the size of 4×4×256 and the search region feature 1104 with the size of 20×20×256, and "17×17×K" anchors may be output via an RPN 1113. Here, K may indicate a number of anchors per unit. Each anchor may include a probability value of a positive sample according to a classification branch, and position information of a candidate frame according to a regression branch. A predicted target position 1105 may be output based on the probability value and position information.

As shown in FIG. 11A, when a wide FoV tracker is used, a search image 1132 of a search region scaled up by a factor of "r" (e.g., r=2) may be converted to an image block through cropping and/or scaling and may be input to a backbone network 1112, and the backbone network 1112 may output a search region feature 1135. In a process of cropping and/or scaling the search image 1132, a size of an object may be reduced by a factor of "1/r". The template feature 1103 may be scaled down by a factor of "1/r" via the template rescaling network 1142, and a correlation may be computed through a convolution operation between a rescaling result 1134 and the search region feature 1135. An RPN 1144 may output "19×19×K" anchors. A predicted target position 1136 may be output based on a probability value and position information.

As shown in FIG. 11B, when a narrow FoV tracker is used, a search image 1182 of a search region scaled down by a factor of "1/r" (e.g., r=1) may be converted to an image block through cropping and/or scaling and may be input to a backbone network 1193, and the backbone network 1193 may output a search region feature 1185. In a process of cropping and/or scaling the search image 1182, a size of an object may be increased by a factor of "r". A template feature 1183 may be scaled up by a factor of "r" via the template rescaling network 1192, and a correlation may be computed through a convolution operation between a rescaling result 1184 and the search region feature 1185. An RPN 1194 may output "12×12×K" anchors. In addition, the description provided with reference to FIG. 11A may apply to an example of FIG. 11B.

The object tracking method according to examples described herein may apply to a combination of cameras with different FoVs in a multi-camera system as well as different sizes of a search region in a single camera system. For example, the examples may apply to a mobile device including a plurality of cameras with different FoVs. Cameras may have different parameters such as an aperture range and an equivalent focal length. Hereinafter, operations according to examples will be further described based on a target tracking function of a mobile device with a dual camera. For example, a dual camera may be composed of a normal camera with an equivalent focal length of 26 mm and f/1.8, and a wide-angle camera with an equivalent focal length of 13 mm and f/2.2 may be used as a dual camera. In the object tracking method according to the examples herein, a first image frame (e.g., a previous image frame) and a second image frame (e.g., a current image frame) may be collected by different image collectors (e.g., cameras) of the same mobile device (e.g., a smartphone). For example, the first image frame may be collected using a normal camera, and the second image frame may be collected using a wide-angle camera.

Figure 12:
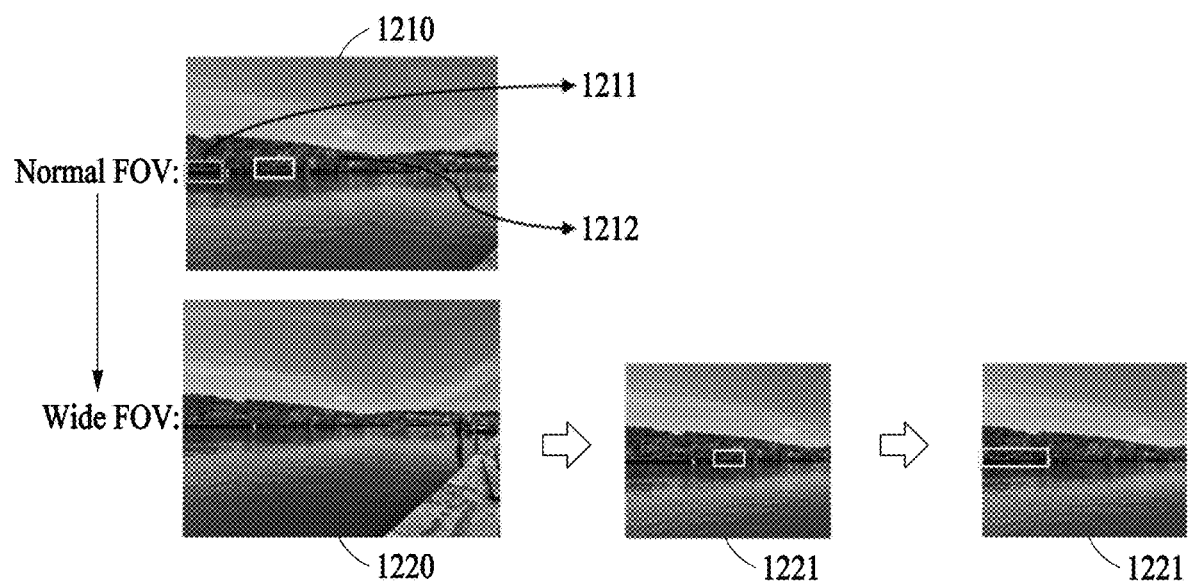
FIG. 12 illustrates an example of an effect obtained by applying an object tracking method to a smartphone having two cameras.

As shown in FIG. 12, an image frame 1210 may be acquired using a normal camera of a normal FoV. Since a portion of a target vessel 1211 in the image frame 1210 is outside the image frame 1210, a neighboring vessel 1212 having a higher similarity to a template than that of the target vessel 1211 may be incorrectly set as a target. If it is confirmed that a prediction confidence is low, an image frame 1220 may be acquired using a wide-angle camera with a wide FoV according to an FoV determination scheme according to the examples. The image frame 1220 may be the next frame of the image frame 1210. An image block 1221 may be acquired from the image frame 1220, and a bounding box corresponding to the target vessel 1211 may be derived.

Figure 13:
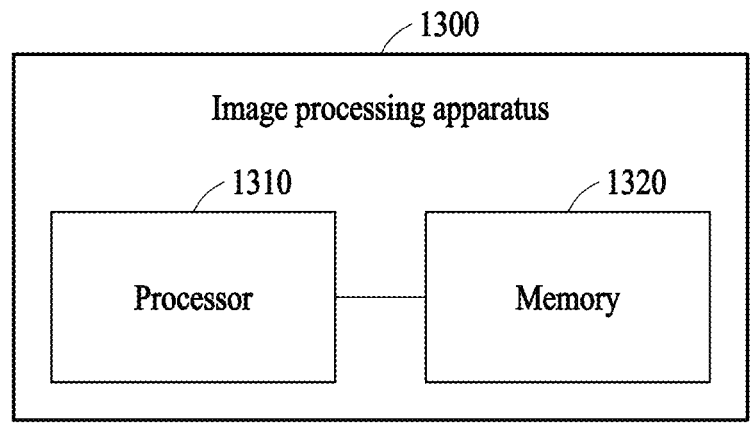
FIG. 13 illustrates an example of a structure of an object tracking apparatus.

FIG. 13 illustrates an example of a structure of an object tracking apparatus 1300. Referring to FIG. 13, the object tracking apparatus 1300 may include a processor 1310 and a memory 1320. The memory 1320 may be connected to the processor 1310 and may store instructions executable by the processor 1310, data to be computed by the processor 1310, or data processed by the processor 1310. The memory 1320 may include a non-transitory computer-readable medium, for example, a high-speed random-access memory (RAM), and/or a non-volatile computer-readable storage medium, for example, at least one disk storage device, a flash memory device, or another non-volatile solid-state memory devices.

The processor 1310 may execute the instructions stored in the memory 1320 to perform the operations described above with reference to FIGS. 1 to 12 and operations that will be described below with reference to FIG. 14. For example, the processor 1310 may determine a first target tracking state by tracking a target from a first image frame with a first FoV, determine a second FoV based on the first FoV and the first target tracking state, and generate a second target tracking result by tracking a target from a second image frame with the second FoV. The processor 1310 may generate a first target tracking result by tracking the target from the first image frame and may determine the first target tracking state based on the first target tracking result.

The first target tracking result may include a prediction confidence, and the processor 1310 may determine the first target tracking state according to a result of a comparison of the prediction confidence and a preset threshold. The first target tracking result may include a prediction confidence, and either one or both of a target position and a target size. The processor 1310 may obtain at least one of a target relative displacement corresponding to the first image frame and a ratio between a size of the target of the first image frame and a size of the first image frame, based on either one or both of the target position and the target size, and may determine the first target tracking state based on a result of a comparison of the prediction confidence and a preset threshold, and either one or both of a result of a comparison of the target relative displacement and a reference displacement and a result of a comparison of the ratio and a reference ratio.

Figure 14:
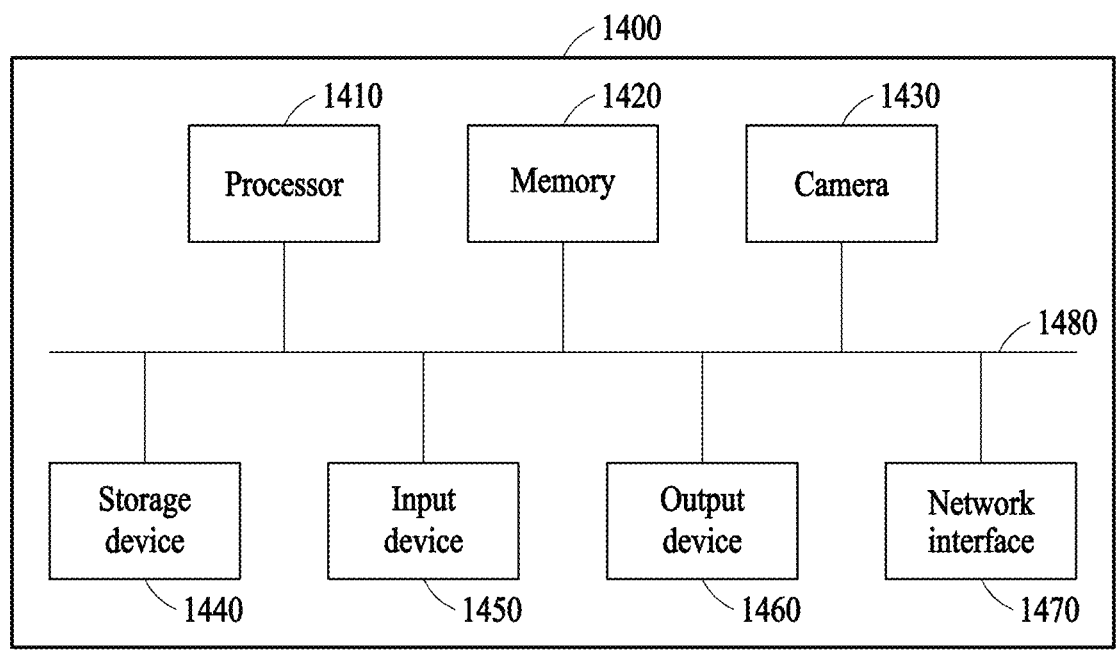
FIG. 14 illustrates an example of a structure of an electronic device.

In addition, the foregoing description provided with reference to FIGS. 1 to 12 and the following description provided with reference to FIG. 14 may apply to the object tracking apparatus 1300.

FIG. 14 illustrates an example of an electronic device 1400. Referring to FIG. 14, the electronic device 1400 may include a processor 1410, a memory 1420, a camera 1430, a storage device 1440, an input device 1450, an output device 1460, and a network interface 1470, and these components may communicate with one another through a communication bus 1480. For example, the electronic device 1400 may be embodied as at least a portion of a mobile device (e.g., a mobile phone, a smartphone, a personal digital assistant (PDA), a netbook, a tablet computer, a laptop computer, etc.), a wearable device (e.g., a smartwatch, a smart band, smart eyeglasses, etc.), a computing device (e.g., a desktop, a server, etc.), a home appliance (e.g., a television (TV), a smart TV, a refrigerator, etc.), a security device (e.g., a door lock, etc.), or a vehicle (e.g., an autonomous vehicle, a smart vehicle, etc.). The electronic device 1400 may include, structurally and/or functionally, the object tracking apparatus 1300 of FIG. 13.

The processor 1410 may execute instructions and functions in the electronic device 1400. For example, the processor 1410 may process instructions stored in the memory 1420 or the storage device 1440. The processor 1410 may perform one or more of the operations described above with reference to FIGS. 1 to 13. The memory 1420 may include a non-transitory computer-readable storage medium or a non-transitory computer-readable storage device. The memory 1420 may store instructions that are to be executed by the processor 1410, and may also store information associated with software and/or applications when the software and/or applications are being executed by the electronic device 1400.

The camera 1430 may capture a photo and/or a video. The camera 1430 may operate with a plurality of reference FoVs, for example, a normal FoV, a wide FoV, and a narrow FoV. For example, the camera 1430 may generate images of different FoVs, using a plurality of cameras with different FoVs or using lenses with different FoVs.

The storage device 1440 may include a non-transitory computer-readable storage medium or a non-transitory computer-readable storage device. The storage device 1440 may store a greater amount of information than the memory 1420 and store the information for a long period of time. For example, the storage device 1440 may include a magnetic hard disk, an optical disk, a flash memory, a floppy disk, or other known non-volatile memories.

The input device 1450 may receive an input from a user through a traditional input scheme using a keyboard and a mouse, and through a newer input scheme such as a touch input, a voice input and an image input. The input device 1450 may include, for example, a keyboard, a mouse, a touchscreen, a microphone, and/or other devices that may detect the input from the user and transmit the detected input to the electronic device 1400. The output device 1460 may provide an output of the electronic device 1400 to a user through a visual, auditory, or tactile channel. The output device 1460 may include, for example, a display, a touch screen, a speaker, a vibration generator, or any other device that provides an output to a user. The network interface 1470 may communicate with an external device through a wired or wireless network.

According to examples, an apparatus may implement at least one module among a plurality of modules through an artificial intelligence (AI) model. AI-related functions may be performed by a non-volatile memory, a volatile memory, and a processor.

The processor may include one or more processors. The one or more processors may be, for example, general-purpose processors such as a central processing unit (CPU) and an application processor (AP), dedicated graphics processors such as a graphics processing unit (GPU) and a vision processing unit (VPU), and/or dedicated AI processors such as a numeric processing unit (NPU).

The one or more processors may control processing of input data based on a predefined operation rule or AI model stored in the non-volatile memory and the volatile memory. The predefined operation rule or AI model may be provided through training or learning.

Herein, providing of the predefined operation rules or AI model through learning may indicate obtaining a predefined operation rule or AI model with desired characteristics by applying a learning algorithm to a plurality of pieces of training data. The training may be performed by a device having an AI function according to the disclosure, or by a separate server and/or system.

The AI model may include a plurality of neural network layers. Each of the neural network layers may have a plurality of weight values, and calculation of one layer may be performed through a calculation result of a previous layer and a plurality of weight values of a current layer. A neural network may include, for example, a convolutional neural network (CNN), a deep neural network (DNN), a recurrent neural network (RNN), a restricted Boltzmann machine (RBM), a deep belief network (DBN), a bidirectional recurrent deep neural network (BRDNN), a generative adversarial network (GAN), and a deep Q network, but is not limited thereto.

The learning algorithm may be a method of training a predetermined target apparatus, for example, a robot, based on a plurality of pieces of training data and of enabling, allowing or controlling the target apparatus to perform determination or prediction. The learning algorithm may include, for example, supervised learning, unsupervised learning, semi-supervised learning, or reinforcement learning, but is not limited thereto.

The RPNs 1113, 1144, and 1194, the backend networks 1013, 1014, 1032, 1053, 1111, and 1112, the rescaling networks 1031, 1051, 1060, 1070, 1142, and 1192, the processors 1310 and 1410, the memories 1320 and 1420, the storage device 1440, the input device 1450, the output device 1460, the network interface 1470, the twin networks, the twin fully convolutional neural networks, the twin RPNs, the neural networks, the processors, and the memories in FIGS. 1 to 14 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1 to 14 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method with object tracking, the method comprising:
   determining a first target tracking state indicating whether a tracking state of a target that has been detected is stable by tracking the target from a first image frame using a first search region of the first image frame, the first search region having a first region size;
   determining, based on a result of the determining of the first target tracking state and the first region size, a second region size for a second search region of a second image frame from among a plurality of predetermined reference region sizes; and generating a second target tracking result by tracking a target from the second image frame by using the second search region of the second image frame, the second search region having the second region size, wherein the first region size and the second region size are selected from a first reference region size, a second reference region size, and a third reference region size, among the plurality of predetermined reference region sizes, wherein the second reference region size is greater than the first reference region size, wherein the third reference region size is less than the first reference region size, and wherein the determining of the second region size comprises:

when the first region size is the first reference region size, determining the second region size as the second reference region size in response to the first target tracking state being a second state, determining the second region size as the third reference region size in response to the first target tracking state being a first state, and determining the second region size as the first reference region size in response to the first target tracking state being a third state;

when the first region size is the second reference region size, determining the second region size as the second reference region size in response to the first target tracking state being the second state, determining the second region size as the first reference region size in response to the first target tracking state being the first state, and determining the second region size as the second reference region size in response to the first target tracking state being the third state; and when the first region size is the third reference region size, determining the second region size as the first reference region size in response to the first target tracking state being the second state, determining the second region size as the third reference region size in response to the first target tracking state being the first state, and determining the second region size as the third reference region size in response to the first target tracking state being the third state.

2. The method of claim 1, wherein the first image frame and the second image frame are collected by different image collectors of a same electronic device.

3. The method of claim 1, wherein the determining of the first target tracking state comprises:
generating a first target tracking result by tracking the target from the first image frame by using the first search region of the first image frame; and
determining the first target tracking state based on the first target tracking result.

4. The method of claim 3, wherein the first target tracking result comprises a prediction confidence, and
wherein the determining of the first target tracking state based on the first target tracking result comprises determining the first target tracking state according to a result of a comparison of the prediction confidence and a preset threshold.

5. The method of claim 4, wherein the preset threshold comprises a first threshold and a second threshold, and
wherein the determining of the first target tracking state according to the result of the comparison comprises:

in response to the prediction confidence being greater than the first threshold, determining the first target tracking state as the first state;
in response to the prediction confidence being less than the second threshold, determining the first target tracking state as the second state; and
in response to the prediction confidence being greater than the second threshold and less than the first threshold, determining the first target tracking state as the third state.

6. The method of claim 1, wherein the generating of the second target tracking result comprises:
setting a reference template feature based on an initial image frame of an image sequence to which the second image frame belongs;
determining the second search region of the second image frame based on the second region size and a position of the target of the first image frame, and obtaining a search feature from the second search region of the second image frame; and
generating the second target tracking result based on the reference template feature and the search feature.

7. The method of claim 6, wherein the generating of the second target tracking result based on the reference template feature and the search feature comprises:
in response to the second region size being the second reference region size or the third reference region size, generating a scaled template feature by scaling the reference template feature; and
generating the second target tracking result based on the scaled template feature and the search feature.

8. The method of claim 7, wherein the generating of the scaled template feature comprises:
in response to the second region size being the second reference region size, generating the scaled template feature by scaling down the reference template feature; and
in response to the second region size being the third reference region size, generating the scaled template feature by scaling up the reference template feature.

9. The method of claim 8, wherein the generating of the second target tracking result based on the scaled template feature and the search feature comprises:
generating a feature map by performing a convolution operation on the scaled template feature and the search feature using the scaled template feature as a convolution kernel; and
obtaining the second target tracking result based on the feature map.

10. The method of claim 3, wherein the first target tracking result comprises a prediction confidence, and either one or both of a target position and a target size, and
wherein the determining of the first target tracking state based on the first target tracking result comprises:
obtaining at least one of a target relative displacement corresponding to the first image frame and a ratio between a size of the target of the first image frame and a size of the first image frame, based on either one or both of the target position and the target size; and
determining the first target tracking state based on a result of a comparison of the prediction confidence and a preset threshold, and either one or both of a result of a comparison of the target relative displacement and a reference displacement and a result of a comparison of the ratio and a reference ratio.

11. The method of claim 10, wherein the determining of the first target tracking state based on the result of the comparison of the prediction confidence and the preset threshold, and either one or both of the result of the comparison of the target relative displacement and the reference displacement and the result of the comparison of the ratio and the reference ratio comprise:
   in response to the prediction confidence being greater than a first threshold and the target relative displacement being less than the reference displacement, determining the first target tracking state as the first state;
   in response to the prediction confidence being greater than a second threshold and the ratio being less than the reference ratio, determining the first target tracking state as the second state; and
   in response to the prediction confidence being greater than the second threshold and less than the first threshold, determining the first target tracking state as the third state.

12. A non-transitory computer-readable storage medium storing instructions that, when executed by a processor, cause the processor to perform the method of claim 1.

13. An apparatus with object tracking, the apparatus comprising:
   a processor; and
   a memory comprising instructions executable on the processor,
   wherein the processor is configured to, in response to the instructions being executed:
      determine a first target tracking state indicating whether a tracking state of a target that has been detected is stable by tracking the target from a first image frame using a first search region of the first image frame, the first search region having a first region size;
      determine, based on a result of the determining of the first target tracking state and the first region size, a second region size for a second search region of a second image frame from among a plurality of predetermined reference region sizes; and
      generate a second target tracking result by tracking a target from the second image frame by using the second search region of the second image frame, the second search region having the second region size,
   wherein the first region size and the second region size are selected from a first reference region size, a second reference region size, and a third reference region size, among the plurality of predetermined reference region sizes,
   wherein the second reference region size is greater than the first reference region size,
   wherein the third reference region size is less than the first reference region size, and
   wherein to determine the second region size, the processor is configured to:
      when the first region size is the first reference region size, determine the second region size as the second reference region size in response to the first target tracking state being a second state, determine the second region size as the third reference region size in response to the first target tracking state being a first state, and determine the second region size as the first reference region size in response to the first target tracking state being a third state;
      when the first region size is the second reference region size, determine the second region size as the second reference region size in response to the first target tracking state being the second state, determine the second region size as the first reference region size in response to the first target tracking state being the first state, and determine the second region size as the second reference region size in response to the first target tracking state being the third state; and
      when the first region size is the third reference region size, determine the second region size as the first reference region size in response to the first target tracking state being the second state, determine the second region size as the third reference region size in response to the first target tracking state being the first state, and determine the second region size as the third reference region size in response to the first target tracking state being the third state.

14. The apparatus of claim 13, wherein the processor is further configured to:
   generate a first target tracking result by tracking the target from the first image frame by using the first search region of the first image frame; and
   determine the first target tracking state based on the first target tracking result.

15. The apparatus of claim 14, wherein the first target tracking result comprises a prediction confidence, and
   wherein the processor is further configured to determine the first target tracking state according to a result of a comparison of the prediction confidence and a preset threshold.

16. The apparatus of claim 14, wherein the first target tracking result comprises a prediction confidence, and at least one of a target position and a target size, and
   wherein the processor is further configured to:
      obtain at least one of a target relative displacement corresponding to the first image frame and a ratio between a size of the target of the first image frame and a size of the first image frame, based on at least one of the target position and the target size; and
      determine the first target tracking state based on a result of a comparison of the prediction confidence and a preset threshold, and either one or both of a result of a comparison of the target relative displacement and a reference displacement and a result of a comparison of the ratio and a reference ratio.

17. An electronic device, comprising:
   a camera configured to operate with a plurality of reference fields of view (FoVs); and
   a processor configured to:
      generate a first target tracking state indicating whether a tracking state of a target that has been detected is stable by tracking the target from a first image frame using a first search region of the first image frame, the first search region having a first region size;
      determine, based on a result of the determining of the first target tracking state and the first region size, a second region size for a second search region of a second image frame from among a plurality of predetermined reference region sizes; and
      generate a second target tracking result by tracking a target from the second image frame by using the second search region of the second image frame, the second search region having the second region size,
   wherein the first region size and the second region size are selected from a first reference region size, a second reference region size, and a third reference region size, among the plurality of predetermined reference region sizes,
   wherein the second reference region size is greater than the first reference region size, wherein the third reference region size is less than the first reference region size, and wherein to determine the second region size, the processor is configured to:

when the first region size is the first reference region size, determine the second region size as the second reference region size in response to the first target tracking state being a second state, determine the second region size as the third reference region size in response to the first target tracking state being a first state, and determine the second region size as the first reference region size in response to the first target tracking state being a third state;

when the first region size is the second reference region size, determine the second region size as the second reference region size in response to the first target tracking state being the second state, determine the second region size as the first reference region size in response to the first target tracking state being the first state, and determine the second region size as the second reference region size in response to the first target tracking state being the third state; and when the first region size is the third reference region size, determine the second region size as the first reference region size in response to the first target tracking state being the second state, determine the second region size as the third reference region size in response to the first target tracking state being the first state, and determine the second region size as the third reference region size in response to the first target tracking state being the third state, wherein the first region size corresponds to a first reference FoV among the plurality of reference FoVs, and the second region size corresponds to a second reference FoV among the plurality of reference FoVs.

* * * * *